US006860195B2

(12) United States Patent
Cunningham et al.

(10) Patent No.: US 6,860,195 B2
(45) Date of Patent: Mar. 1, 2005

(54) FOOD WINDING APPARATUS AND SYSTEM

(75) Inventors: Michael J. Cunningham, Minneapolis, MN (US); Michael C. Hoskins, Bradenton, FL (US)

(73) Assignee: ConAgra Foods, Inc., Omaha, NE (US)

( * ) Notice: Subject to any disclaimer, the term of this patent is extended or adjusted under 35 U.S.C. 154(b) by 0 days.

(21) Appl. No.: 10/883,165

(22) Filed: Jul. 1, 2004

(65) Prior Publication Data

US 2005/0000369 A1 Jan. 6, 2005

Related U.S. Application Data

(62) Division of application No. 10/407,119, filed on Apr. 3, 2003, now Pat. No. 6,783,786.

(51) Int. Cl.[7] ............................... A23L 1/00; A23P 1/00
(52) U.S. Cl. ..................... 99/450.2; 99/450.1; 99/486
(58) Field of Search ...................... 99/348, 352–355, 99/485, 486, 489, 450.1, 450.2, 450.3, 450.7; 426/501, 512, 514, 518, 660; 425/321, 335

(56) References Cited

U.S. PATENT DOCUMENTS

| 72,800 | A | 12/1867 | Coffin |
| 523,853 | A | 7/1894 | Foster |
| 785,822 | A | 3/1905 | Mitchem |
| 851,770 | A | 4/1907 | Nichols |
| 939,616 | A | 11/1909 | Murphey |
| 1,252,483 | A | 1/1918 | Pattison |
| 1,297,959 | A | 3/1919 | Young |
| 1,536,224 | A | 5/1925 | Lauterbur et al. |
| 1,559,449 | A | 10/1925 | Mordt |
| 1,599,271 | A | 9/1926 | Baxenden |
| 1,873,716 | A | 8/1932 | Nickerson |
| 2,214,917 | A | 9/1940 | Angell |
| 2,227,728 | A | 1/1941 | Lombi |
| 2,481,753 | A | 9/1949 | Johnson |
| 2,627,825 | A | 2/1953 | Stiles |
| 2,663,130 | A | 12/1953 | Donofrio |
| 2,726,156 | A | 12/1955 | Armstrong |
| 2,735,382 | A | 2/1956 | Hansen |
| 3,051,583 | A | 8/1962 | Tindall |
| 3,172,372 | A | 3/1965 | Packman |
| 3,188,780 | A | 6/1965 | Mead |
| 3,225,717 | A | 12/1965 | Page |
| 3,527,424 | A | 9/1970 | Goldman |
| 3,669,007 | A | 6/1972 | Pulici |
| 3,704,664 | A | 12/1972 | Fisher, Jr. |
| 3,804,956 | A | 4/1974 | Bongiovanni |

(List continued on next page.)

FOREIGN PATENT DOCUMENTS

| DE | 43 31 867 A1 | 3/1995 |
| EP | 0 739 587 A1 | 4/1996 |
| GB | 2 059 858 A | 4/1981 |
| WO | WO 97/33822 | 9/1997 |

*Primary Examiner*—Timothy F. Simone
(74) *Attorney, Agent, or Firm*—Bingham McCutchen LLP

(57) ABSTRACT

A food winding apparatus, system, and method of forming a rolled food item utilizing a slotted spool or cup and a push plate to eject the rolled food item from the spool. A food winding unit utilizes a motor to rotate a slotted spool. The leading end of a supported strip of food is detected by a sensor and directed into the slot of a spool. A microcontroller triggers a motor in response to the sensor signal to rotate and form a rolled food item after a predetermined number of rotations. An actuator is activated to displace an ejection plate to eject the rolled food item from the slotted spool. The winding unit can be integrated into a system including an extruder to deposit food onto support strips, a series of conveyors, and a rotary knife to cut the supported strip of food into predetermined lengths suitable for being rolled into a food item by the winding unit.

52 Claims, 20 Drawing Sheets

U.S. PATENT DOCUMENTS

| | | |
|---|---|---|
| 3,853,281 A | 12/1974 | Elliott |
| 3,861,291 A | 1/1975 | Guzaski |
| 3,869,845 A | 3/1975 | Rodach et al. |
| 3,956,517 A | 5/1976 | Curry et al. |
| 4,043,259 A | 8/1977 | Sato |
| 4,073,953 A | 2/1978 | Trostmann et al. |
| 4,110,482 A | 8/1978 | Sato |
| 4,121,956 A | 10/1978 | Sample |
| 4,171,197 A | 10/1979 | Sato |
| 4,192,473 A | 3/1980 | Wellman |
| 4,313,719 A | 2/1982 | Lundgren |
| 4,486,452 A | 12/1984 | Cloud et al. |
| 4,588,597 A | 5/1986 | Caille |
| 4,600,595 A | 7/1986 | Svengren et al. |
| 4,630,426 A | 12/1986 | Gentry |
| 4,694,741 A | 9/1987 | Haas, Sr. et al. |
| 4,741,263 A | 5/1988 | Ueno et al. |
| 4,742,969 A | 5/1988 | Masuda et al. |
| 4,849,230 A | 7/1989 | Varvello |
| 4,850,087 A | 7/1989 | Gronau |
| 4,882,175 A | 11/1989 | Ream et al. |
| 4,917,590 A | 4/1990 | Svengren et al. |
| 4,954,064 A | 9/1990 | Siegenthaler |
| 4,961,949 A | 10/1990 | Barnes et al. |
| 4,994,293 A | 2/1991 | Hayashi |
| 5,012,726 A | 5/1991 | Fehr et al. |
| 5,133,980 A | 7/1992 | Ream et al. |
| 5,205,106 A | 4/1993 | Zimmermann et al. |
| 5,284,667 A | 2/1994 | Zimmermann et al. |
| 5,308,236 A | 5/1994 | Wing-Fai |
| 5,455,053 A | 10/1995 | Zimmermann et al. |
| 5,516,542 A | 5/1996 | Zimmermann et al. |
| 5,538,414 A | 7/1996 | Kobayashi et al. |
| 5,538,742 A | 7/1996 | McHale et al. |
| 5,579,669 A | 12/1996 | Kind et al. |
| 5,609,094 A | 3/1997 | Ueno et al. |
| 5,655,439 A | 8/1997 | Ueno et al. |
| 5,664,485 A | 9/1997 | McDilda et al. |
| 5,723,163 A | 3/1998 | Zimmermann et al. |
| 5,795,607 A | 8/1998 | Haas et al. |
| 5,814,360 A | 9/1998 | McDilda et al. |
| 5,876,777 A | 3/1999 | Zimmermann et al. |
| 5,935,613 A | 8/1999 | Benham et al. |
| 6,010,730 A | 1/2000 | Okaizumi et al. |
| 6,030,651 A | 2/2000 | Bronner |
| 6,106,880 A | 8/2000 | Harada et al. |
| 6,165,520 A | 12/2000 | Harada et al. |
| 6,171,628 B1 | 1/2001 | Ueno |
| 6,200,617 B1 * | 3/2001 | Babiarz et al. ............. 426/297 |
| 6,254,916 B1 | 7/2001 | Haas, Sen. et al. |

* cited by examiner

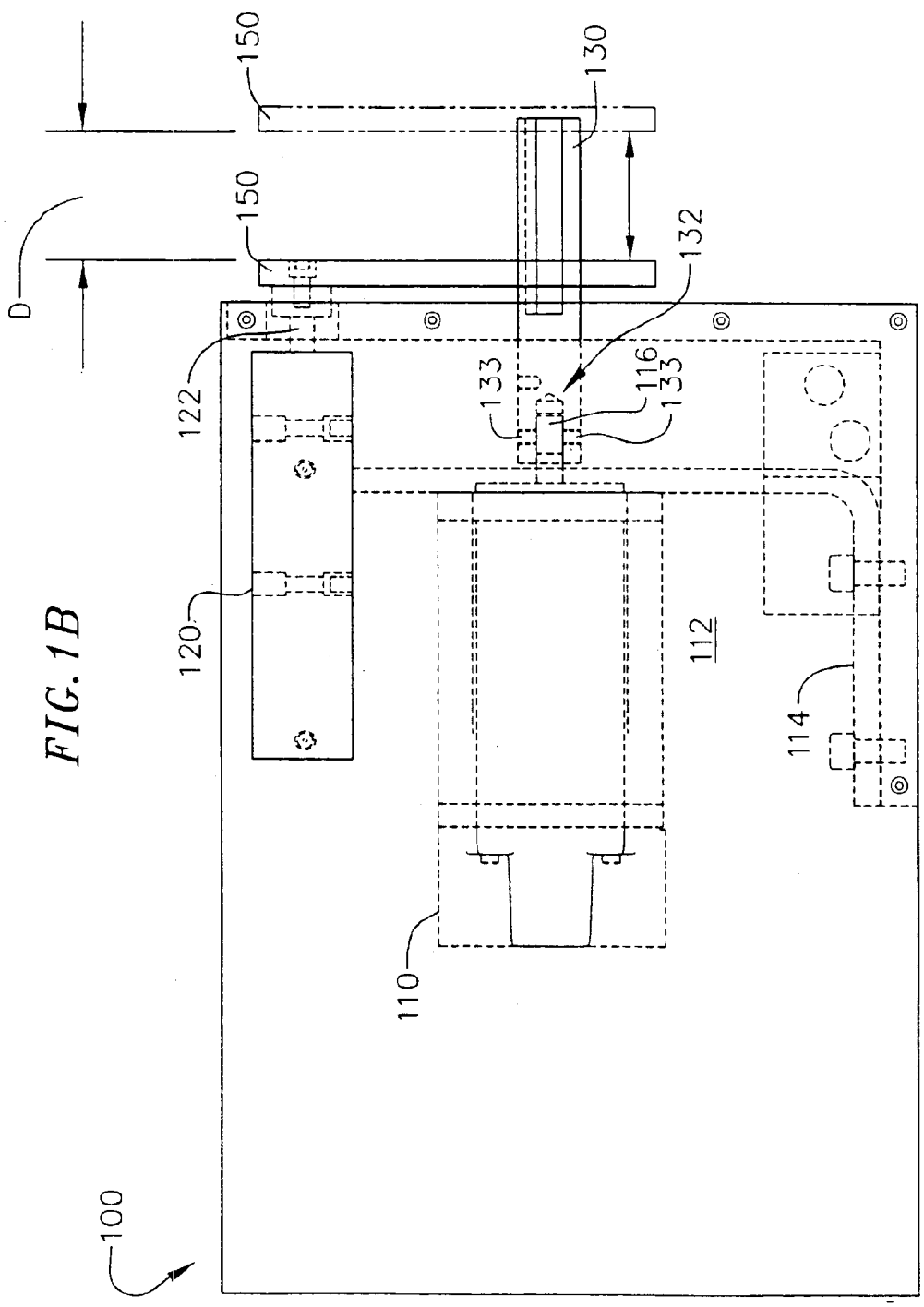

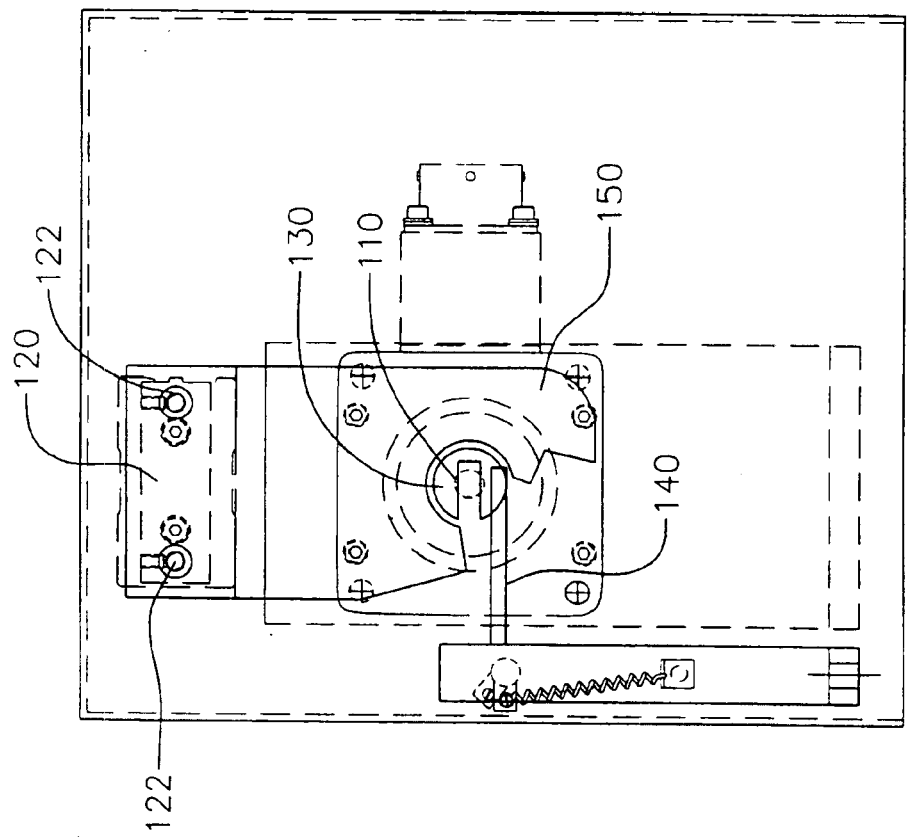

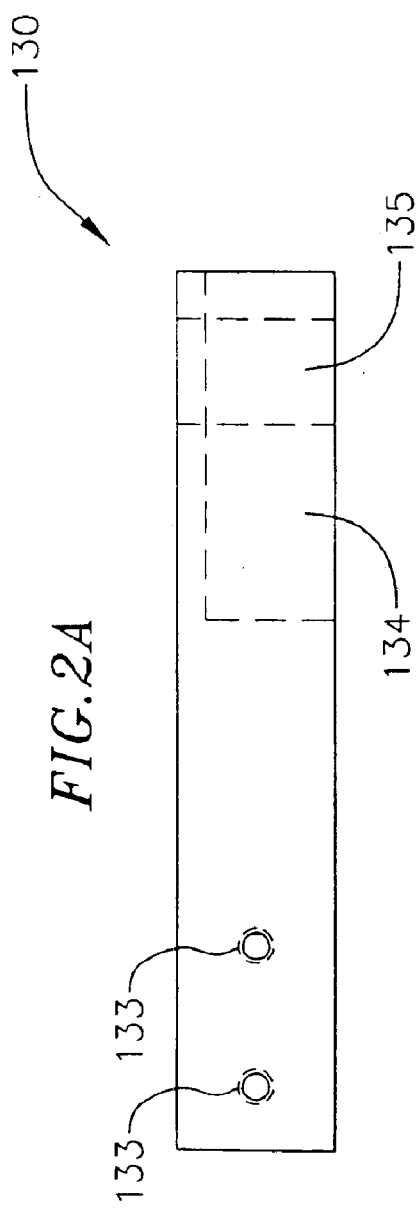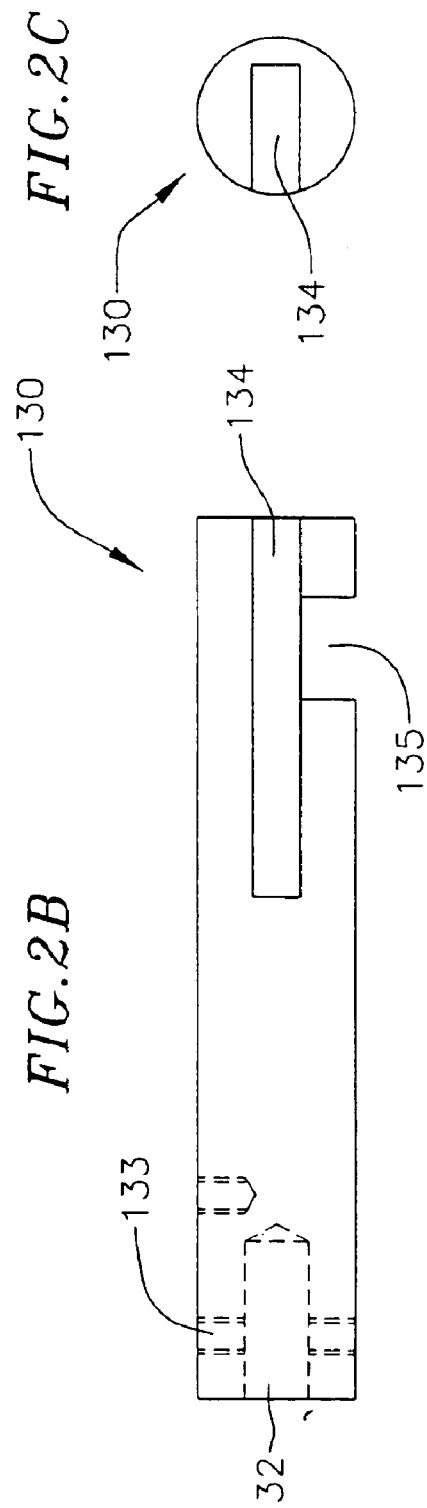

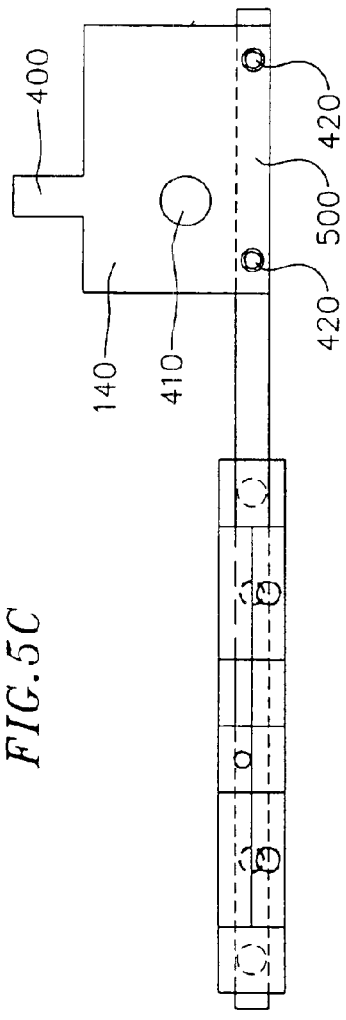
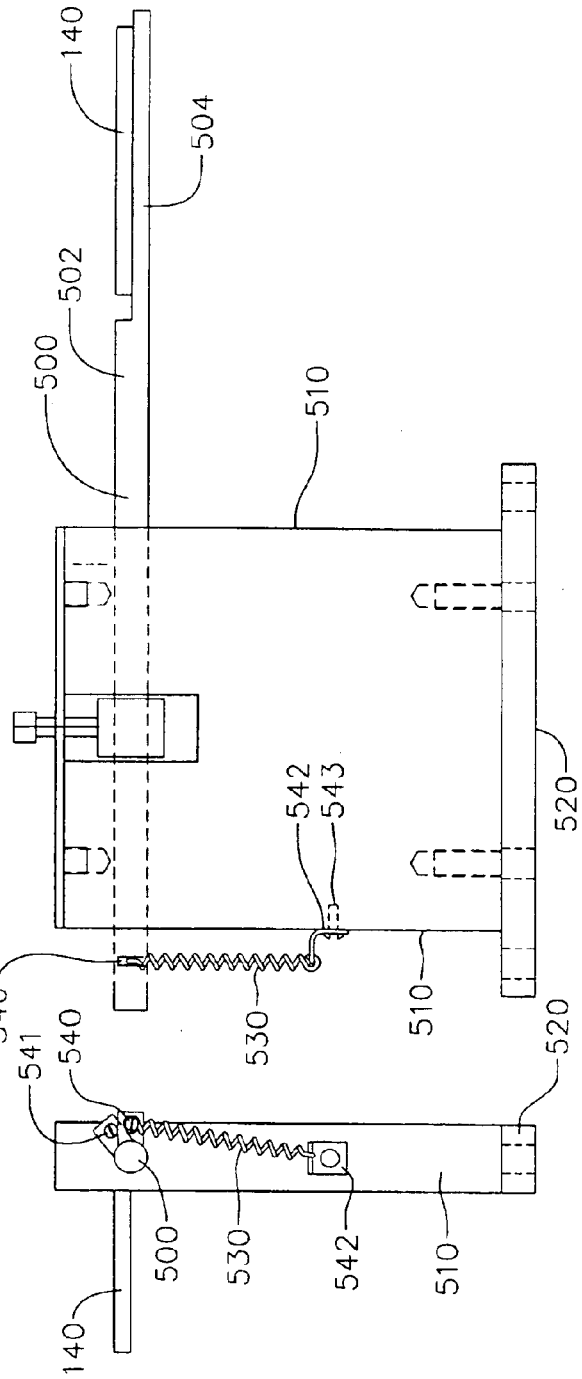

FOOD WINDING APPARATUS AND SYSTEM

CROSS-REFERENCE TO RELATED APPLICATION

This application is a divisional of application Ser. No. 10/407,119, filed Apr. 3, 2003, now U.S. Pat. No. 6,783,786, priority of which is claimed under 35 U.S.C. §120, the entire disclosure of which is incorporated herein by reference.

FIELD OF THE INVENTION

The present invention relates to the production of food items, and more particularly, to an apparatus, system and method for manufacturing a rolled food item utilizing a slotted spool which rotates to form the rolled food item and pushing or ejecting the rolled food item from the slotted spool.

DESCRIPTION OF RELATED ART

Various types of food items have been manufactured using different winding or shaping mechanisms and techniques.

For example, some systems have formed a rolled food item by winding a strip of food upon itself. More specifically, the strip of food is directed to one or more rollers which rotate in op directions to cause the leading end of the strip to fold upon itself. With the continuing rotation of the roller(s), a loosely rolled food item is formed.

Other conventional techniques utilize a series compression or forming rollers to form a layer of food. The food is deposited onto a support strip. The supported strip of food is then wound, using a rotating fork with tines. More specifically, a deformable or pliable food substance is inserted into a containment bin. Rollers which rotate in opposite directions are positioned below the bin. One roller has a flat face whereas the other roller, i.e., a forming roller, includes an annular depression or groove. As the food substance is dropped from the bin between the rotating rollers, a strip of food is formed at the opposite of the rotating rollers in the shape of the forming groove. The groove-shaped strip of food is deposited or rolled onto a support strip which is supplied by a different roller positioned below the forming rollers.

The supported food strip is then cut two times into strips—cut to a length and cut to a width. The strips are passed between legs or tines of a fork that is driven or rotated by a motor. As a result, a product is formed having a flattened shape. A label is then attached to the rolled product to ensure that it does not unroll. The motor and fork assembly are then reciprocated together such that the product rolled around the fork slides from the fork.

These examples of previously known systems, however, have a number of shortcomings. First, these systems typically utilize a large number of components to form a supported strip of food. For example, the conventional roller forming system uses a collection bin, multiple formation rollers, a support material roller, and two cutting systems to form supported strips of food having a certain length and width. Utilizing such a large number of components increases the cost of the system and related maintenance, repair and cleaning.

Second, conventional systems typically produce a food item having limited selection of ingredients as a result of using a collection bin. If mixtures of food are added to the bin, the output of the bin is not easily controlled and may contain undesirable mixtures and appearances.

Third, it is inconvenient and aesthetically displeasing when a customer must remove an adhesive label from the rolled food item. Further, the cost of labels and applying the labels can be costly.

Fourth, using a fork for winding the food item is undesirable because the length of supported strip of food that is inserted between the fork tines must be carefully controlled. Inserting the strip too far between the tines will result in the end of the food strip extending beyond the fork tines. As a result, there can be uneven rolling of the item around the fork. Further, as a result of using a fork, friction forces between the food item and the tines of the fork are greatest at the tines. Thus, when the fork and motor assembly is retracted, food is likely to stick to the tines.

Fifth, known systems that use a fork typically wind the supported food product around the fork without any tension being applied to the product as it is rolled. Consequently, the freely supported roll may not be tightly wound, and the rolled product can unwind due to low roll tension.

As a final example, known systems typically lack the ability to adapt to other operating parameters or design configurations. This is due, in part, to fixed mechanical components. Consequently, if the type of food, support material, operating speeds, size of the food item, etc. must be changed, these changes may require significant modifications to the mechanical design and components of the systems due to the inflexible parameters.

These shortcomings are further amplified when multiple individual units are integrated into a larger scale system. A need, therefore, exists for an apparatus, system, and method that manufactures rolled food items in a more efficient and effective manner than conventional systems. The improved apparatus, system, and method should form strips of food items without forming rollers, dual cutting systems, and simplify maintenance and cleaning, while providing controlled flexibility in selecting food items to be wound and design and operating parameters. Indeed, fewer moving mechanical components leads to more efficient and reliable operation. A need also exists for a food winding apparatus, system and method that produces a food item in a more controlled and uniform manner with a slotted spool rather than a fork or a self-winding system. Further, a need exists for a large-scale system incorporating the apparatus and method that is capable of manufacturing multiple rolled food items simultaneously while maintaining flexibility, simplicity, and user control.

SUMMARY OF THE INVENTION

The present invention provides an improved food winding apparatus, system, and method of forming a rolled food item utilizing a slotted spool or cup and a push plate to eject the rolled food item from the spool without the need for unnecessary cutting systems, forming rollers, or other winding components.

According to the present invention, a food winding apparatus includes a motor, an ejection actuator, a slotted spool, a guide, a push plate, a sensor, and a control circuit arranged such that the leading end of a length of a supported strip of food is directed from a roll-up conveyor over the guide. The leading end is detected by the sensor which triggers the control circuit to activate the motor and rotate the slotted spool coupled to the motor shaft after the leading end enters the slot. As a result, a rolled food item is formed around the spool. After rotating for a predetermined number of degrees or after a predetermined number of spool revolutions, the control circuit activates the ejection actuator, which displaces a member and the push plate attached thereto. As a result, the plate ejects the rolled food item from the spool.

In further accordance with the present invention, the slot of the spool may include a pointed lip to engage the supported strip of food. The slotted spool may include a pointed lip to engage the supported strip of food and an inner bore or diameter to prevent the supported strip of food from folding upon itself inside the slot. An extruder may deposit food onto the support strip, obviating the need for multiple cutting systems and forming rollers.

In further accordance with the present invention, the guide between an end of the roll-up conveyor and the slot of the spool may be spring loaded to ensure that the guide is properly aligned with the slot for accurate insertion of the leading end into the slot. The guide deflects when the rolled food item is formed. It is also desirable that the push plate includes upper and lower portions to distribute pushing forces around the rolled food item to more effectively eject the rolled food item from the slotted spool.

The rolled food item may be a supported strip of dehydrated fruit product. The strip can be maintained in a roll using: a drop of cornstarch or other edible adhesive.

Also in accordance with the present invention, the system can include a plurality of winding units, an extruder, a conveyor system, and a rotary knife to provide for the simultaneous manufacture of multiple rolled food items.

Further in accordance with the present invention, a method of forming the rolled food item can include transporting the supported strip of food on the roll-up conveyor, directing the leading end of the supported food strip into the slotted spool, activating the motor to rotate the slotted spool to form the rolled food item, and activating the ejection actuator to displace the push plate and eject the rolled food item from the slotted spool.

This method can include depositing the food item onto the support strip, cutting the supported strip of food to a predetermined length, transporting the supported strip of food on the roll-up conveyor, directing the leading end of the supported food strip into a slotted spool, activating the motor to rotate the slotted spool to form the rolled food item, and activating the ejection actuator to displace the push plate and eject the rolled food item from the slotted spool.

BRIEF DESCRIPTION OF THE DRAWINGS

Referring now to the drawings in which like reference numbers represent corresponding parts throughout:

FIGS. 1A–C are respective top, side, and front views of one embodiment of a food winding unit or apparatus;

FIGS. 2A–C are respective top, side, and front views of the slotted spool of the food winding unit;

FIGS. 5A–C are respective front, side, and top views of a spring loaded guide and related spring shaft components;

DETAILED DESCRIPTION OF THE PREFERRED EMBODIMENT

In the following description, reference is made to the accompanying drawings which form a part hereof, and which is shown by way of illustration specific embodiments in which the invention may be practiced. It is to be understood that other embodiments may be utilized as structural changes may be made without departing from the scope of the present invention.

One embodiment provides a food winding unit that winds a supported strip of food into a rolled food item in a uniform and efficient manner using a slotted spool. A food item is deposited directly onto a strip of support material using, for example, an extruder. While other food processing devices can be used to deposit food onto the support strip, this specification refers to an extruder for purposes of explanation. The food is then cooled to an appropriate temperature to form a solid or semi-solid food substance. The strips are cut to a predetermined length, having a leading end and a trailing end. The lengths of supported food strips are aligned, spaced and directed over a guide, e.g., a guide plate or other guide surface. The presence of the leading end is detected by a sensor which generates a presence signal indicating that the leading end has arrived. The presence signal is provided to a micro-controller which actuates a motor after a predetermined delay. During the delay, the leading end passes over the guide plate and into a slot of a spool.

The spool is coupled to a shaft of the motor. After the predetermined delay, the motor is activated, thereby rotating the spool, resulting in the supported strip of food being wound around the spool. After a predetermined number of revolutions, the rolled food item is formed, and the micro-controller activates an ejection actuator, such as a pneumatic cylinder, to stroke, causing a push plate attached to the cylinder to eject the rolled food item from the slotted spool to a discharge conveyor below.

These and other aspects of food winding apparatus, system, and method are described in further detail in the following sections. First, the components of an individual winding unit are described. Then, a system utilizing 24 individual winding units is described. Finally, a method for fabricating a rolled food item with the winding unit and/or system is described.

Food Winding Unit

Figure 1A:
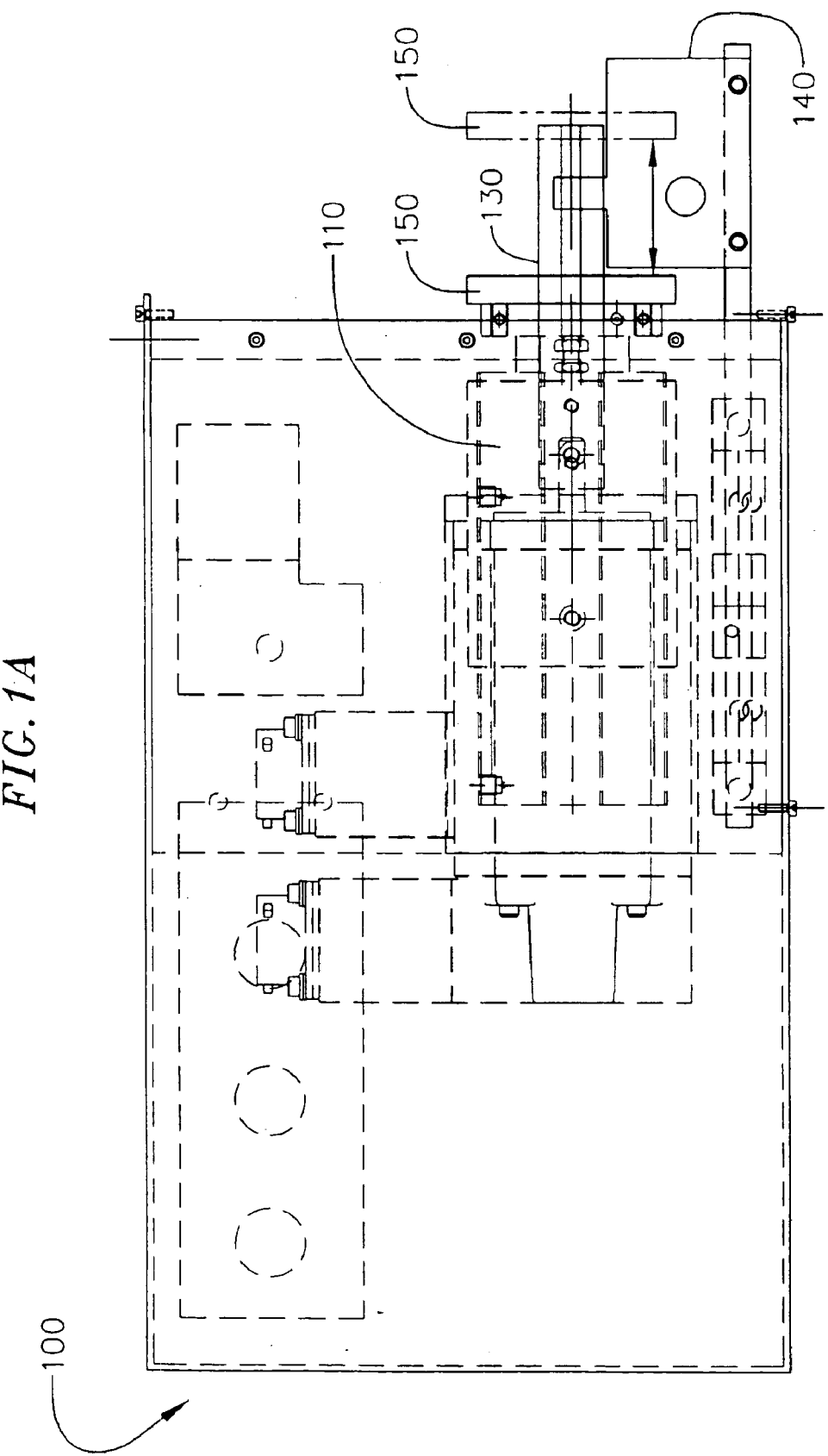

As best shown in FIGS. 1A–C, a winding unit 100 includes a motor 110, an ejection actuator 120, a slotted roll-up cup or spool 130, a spring loaded guide 140 and associated spring shaft components, and a push plate 150. In addition, the winding unit includes electrical components, such as a sensor 160 (not illustrated), a micro-controller, programmable logic controller (PLC), or other control unit 170 (not illustrated), and other associated electrical components. First, the mechanical or electromechanical components of the winding unit will be described, followed by the electrical components.

Motor

The motor 110 is mounted to a body or base 112 of the winding unit 100 via a bracket such as a slide mount 114 or other attachment. The motor 110 is advantageously positioned near the center of the unit body or other location to permit effective placement of other components, although other configurations can be used. When activated, the motor 110 drives a shaft 116.

Those skilled in the art will recognize that many types of motors 110 can be utilized, one example being a servo motor, part no. 2302-1-FOOAA, available from Rockwell Automation/Allen-Bradley Company, 1201 South Second Street, Milwaukee, Wis.

Ejection Actuator

An ejection actuator 120 is also mounted to the base 112 of the winding unit. One example of such an ejection actuator is a pneumatic actuator. For example, FIG. 1B illustrates the ejection actuator 120 mounted to the slide mount 114, similar to the motor 110. As illustrated in FIGS. 1B and 1C, one exemplary pneumatic actuator includes two displaceable members or cylinders 122. The pneumatic actuator strokes or displaces the cylinders 122 from a home position to a distance D.

Various pneumatic actuators can be utilized as part of the winding unit, one example being part no. TB-12-40, available from Bimba Manufacturing Co., Monee, Ill., which drives cylinders 122 to a stroke distance D of about 40 mm or 1.57". Indeed, ejection actuators that stroke to different distances can be utilized depending on the design of other components.

Slotted Spool

A slotted spool 130 is coupled to the shaft 116 of the motor 110. More specifically, the motor shaft 116 is inserted into a coupling cavity 132 within the spool 130. The spool is coupled to the shaft by fasteners secured through tap holes or bores 133 in the side of the spool body. As a result, when the motor is activated, the shaft rotates and which, in turn, rotates the slotted spool.

With reference to FIG. 1C, when the spool rotates in a counterclockwise direction, an upper lip or surface of the slot engages the supported food strip inserted therein. The strip of food is then wound around the exterior body of the spool forming the rolled food item.

FIGS. 2A–C illustrate the slotted spool or cup 130 in further detail. Preferably, the spool has a cylindrical outer surface. In one embodiment, as illustrated in FIG. 2C, the slot 134 of the spool 130 is a rectangular notch extending from one end of the spool through a portion of the spool body. The width of the slot must accommodate the width of the supported strip of food.

Figure 3A:
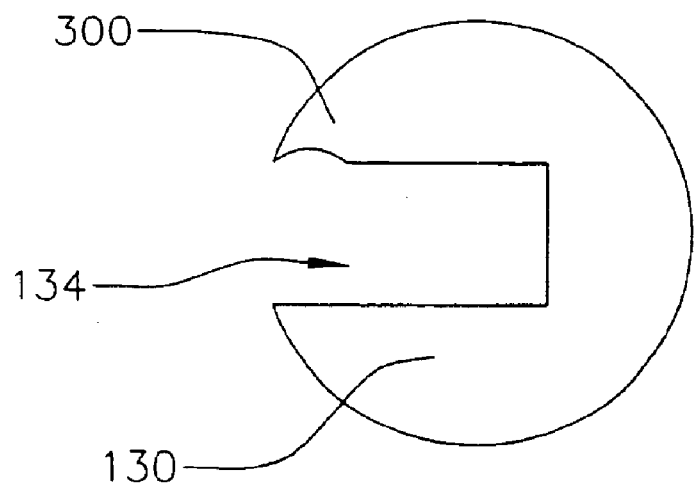
FIGS. 3A–B are front views of alternative embodiments of a slotted spool including a pointed upper lip and a bored inner section or diameter.

In an alternative embodiment, as illustrated in FIG. 3A, the slotted spool includes a slot and an upper lip or section formed as a sharpened or pointed lip 300. The pointed lip 300 can be used to grasp or engage the supported food strip in a secure manner.

Figure 3B:
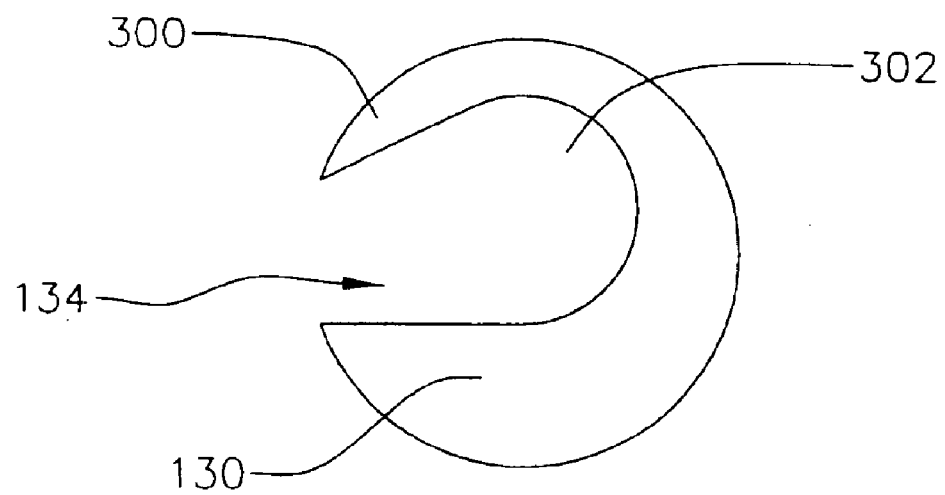

In an alternative embodiment, as best illustrated in FIG. 3B, the spool includes a slot with a sharpened or pointed upper lip 300, as well as a bored inner section or diameter 302. The slot 134 leads to the bored section 302, which is generally circular to reduce the supported food strip being directed against a back wall of a slot 134 and bent or crumpled against the back wall. Crumpling may result in the removal of the rolled food item from the spool 130 being made more difficult if the food sticks to the slot surfaces. However, with an inner bore or diameter 302, the supported strip of food can glide along the bottom surface and in an upward direction along the inner diameter, and possibly folding upon itself. As a result, the lower friction support material glides along the inner slot surface and less food contacts inner surfaces of the bore/slot. This design reduces the amount of food that sticks to the slot, thereby making removal of the food item from the spool easier.

Furthermore, the spool surfaces which contact the supported food strip can be coated with a low friction substance, e.g., TEFLON®, to further reduce friction. As a result, the food does not stick to spool surfaces when the rolled product is ejected from the spool.

The slotted spool designs described above are advantageous compared to other conventional systems, since the supported strip of food is wound in a uniform manner around the spool instead of in an uneven or flattened manner. Further, when the strip enters the slot, it is contained within the body of the slot and/or inner diameter of the spool. This controlled winding is in contrast to systems which use a fork. With a fork, the leading end can extend past the fork tines, thereby resulting in uneven winding or other winding irregularities as a result of the supported strip of food extending beyond the fork tines. This potential problem is obviated with a slotted spool.

The slotted spool also includes a groove 135 around a portion of the cylindrical surface. The groove 135 receives a flange of the guide 140 to align the guide with the slot 134, and direct the supported food strip into the slot 134, as described in further detail below.

Guide

As shown in FIGS. 1A–C, a spring loaded guide 140, e.g., a guide plate or other guide surface, is positioned between an end of the roll-up or supply conveyor (not shown) that transports the supported food strip to the slotted spool 130. In other words, the guide bridges the gap between the end of the conveyor and the slot of the spool and ensures that the leading end of the food strip is properly inserted into the slot. Further, as the rolled product is formed, the guide is deflected by the product, thereby providing tension to the roll as it is formed. As a result, a tighter rolled food product can be formed, and the rolled product is less susceptible to unrolling or unraveling. Thus, packaging becomes more efficient since unraveled portions do not have to be adjusted.

Figure 4A:
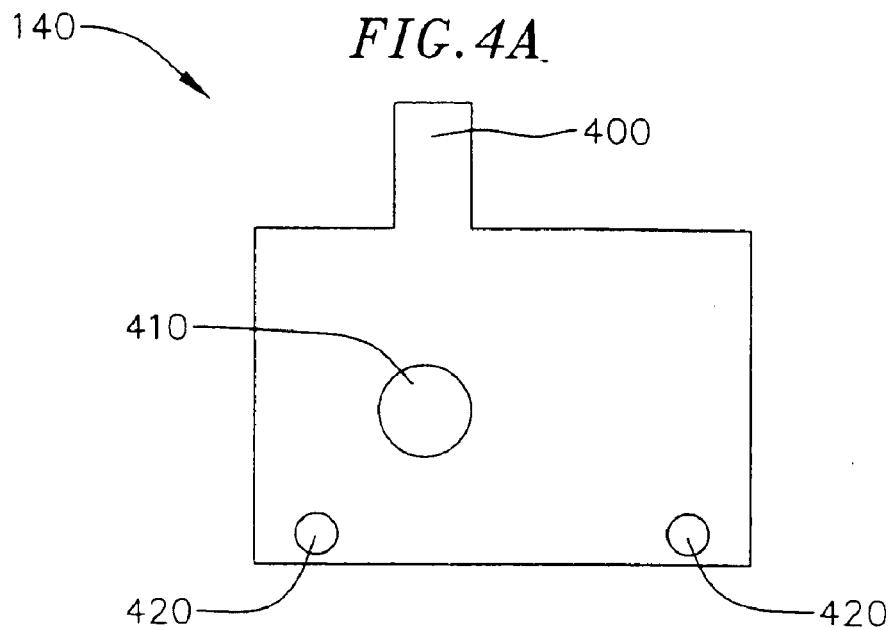
FIGS. 4A–C illustrate a guide that bridges a gap between an end of a supply or roll-up conveyor and the slotted spool, and the manner in which a guide interfaces with the slotted spool.
Figure 4B:
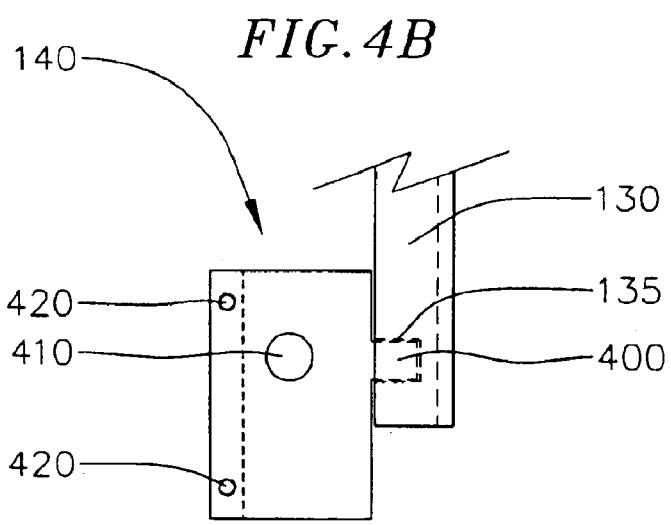
Figure 4C:
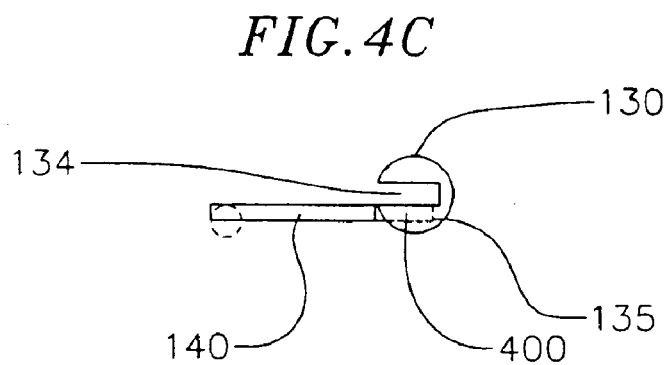

An exemplary guide in the form of a guide plate is illustrated in further detail in FIGS. 4A–C. The guide 140 is generally rectangular and includes a tongue or flange 400, a sensor aperture 410, and connection holes 420. FIGS. 4B–C illustrate the guide 140 interfacing with the slotted spool 130. More specifically, the flange 400 is aligned with and is received by the corresponding groove 135 of the slotted spool 130. As shown in FIG. 4B, the flange 400 is inserted within the groove 135 (FIG. 4C illustrates a side view of the same).

The guide 140 is spring loaded through an associated shaft and spring assembly, as illustrated in FIGS. 5A–C. The guide 140 is secured to a spring shaft 500 through mounting holes 420 with appropriate fasteners. The spring shaft 500 is mounted in a housing 510.

The spring shaft 500 can have a cylindrical section 502 and a semi-circular or flattened section 504 for attachment to a face of the guide 140. Of course, other attachment designs can be utilized.

Referring to FIGS. 5A–B, the spring shaft 500 passes through a spring shaft housing 510. The spring shaft housing 510 is secured to a spring housing plate or base 520. A spring 530 is coupled between mounting clasps. A mounting clasp 540 is coupled to an end of the spring shaft 500 which is opposite the guide plate via, e.g., a screw 541 or other fastener. Similarly, a mounting clasp 542 is coupled to a side of the spring shaft housing 510 via, e.g., a screw 543 or other fastener.

With this arrangement, the guide 140 is held in tension by spring 530. One example spring 530 that can be utilized is a spring having the following attributes: uninstalled length of about 1.5 inches having a tension of about 2.5 lbs/inch; installed length of about 2 inches having a tension of about 3.0 lbs/inch; maximum length of about 2.5" having a tension of about 5.0 lbs/inch; and a maximum spring tension of about 10.0 lbs/inch. Indeed, other spring lengths and tensions can be used depending on the configuration and parameters of other system components. Thus, the recited lengths and tensions are merely examples for purposes of explanation.

The tension of the spring 530 enables the guide plate 140 to be deflected by a relatively small force, e.g., by the force of a rotating rolled food item. As the rolled food item is formed, the guide 140 deflects a greater distance, extending the spring 530 and partially rotating the spring shaft 500 in the same direction. For example, FIG. 5A illustrates the spring shaft 500 and mounting clasp 540 in two different positions—a rest position and a deflected position (mounting clasp in an elevated position) as a result of the guide 140 being deflected by a rolled food item (deflected guide not shown).

Figure 6:
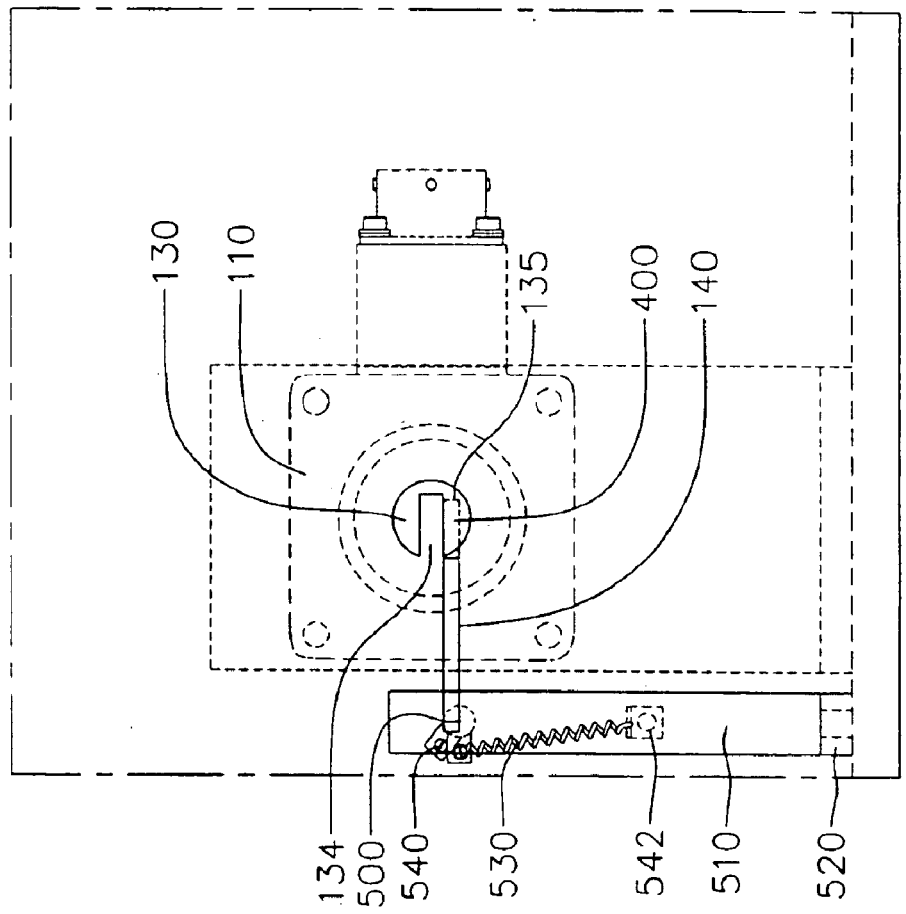
FIG. 6 is a front view of an assembly of a slotted spool, spring loaded guide, and related spring shaft components.

FIG. 6 is a side view of an assembled spring loaded guide 140 and slotted spool 130. The guide is positioned between the end of the conveyor (not shown) and the slotted spool such that the flange 400 of the guide is aligned with a receiving groove 135 around the cylindrical perimeter of the slotted spool 130. In this configuration, the spool can rotate (e.g., counterclockwise) to form the rolled product, and during the rolling process, the guide deflects downward as the rolled item is formed. However, the guide does not impede the spool=s rotation or the formation of the rolled product. Instead, the tension in the spring 530 is selected such that the spool 130 can rotate with the flange 400 within the receiving groove 135 with or without a rolled food item formed thereon.

Ejection Plate

As shown in FIGS. 1A–C, after the rolled food item is formed on the spool, the ejection actuator 120, such as a pneumatic cylinder actuator, is activated. As a result, cylinders 122 and an attached ejection or push plate 150 are displaced to a stroke distance D. This distance is selected to be sufficient to push or eject and disengage the rolled food item from the slotted spool, e.g., D≧length of spool, or D≧the width of the support strip.

Figure 7:
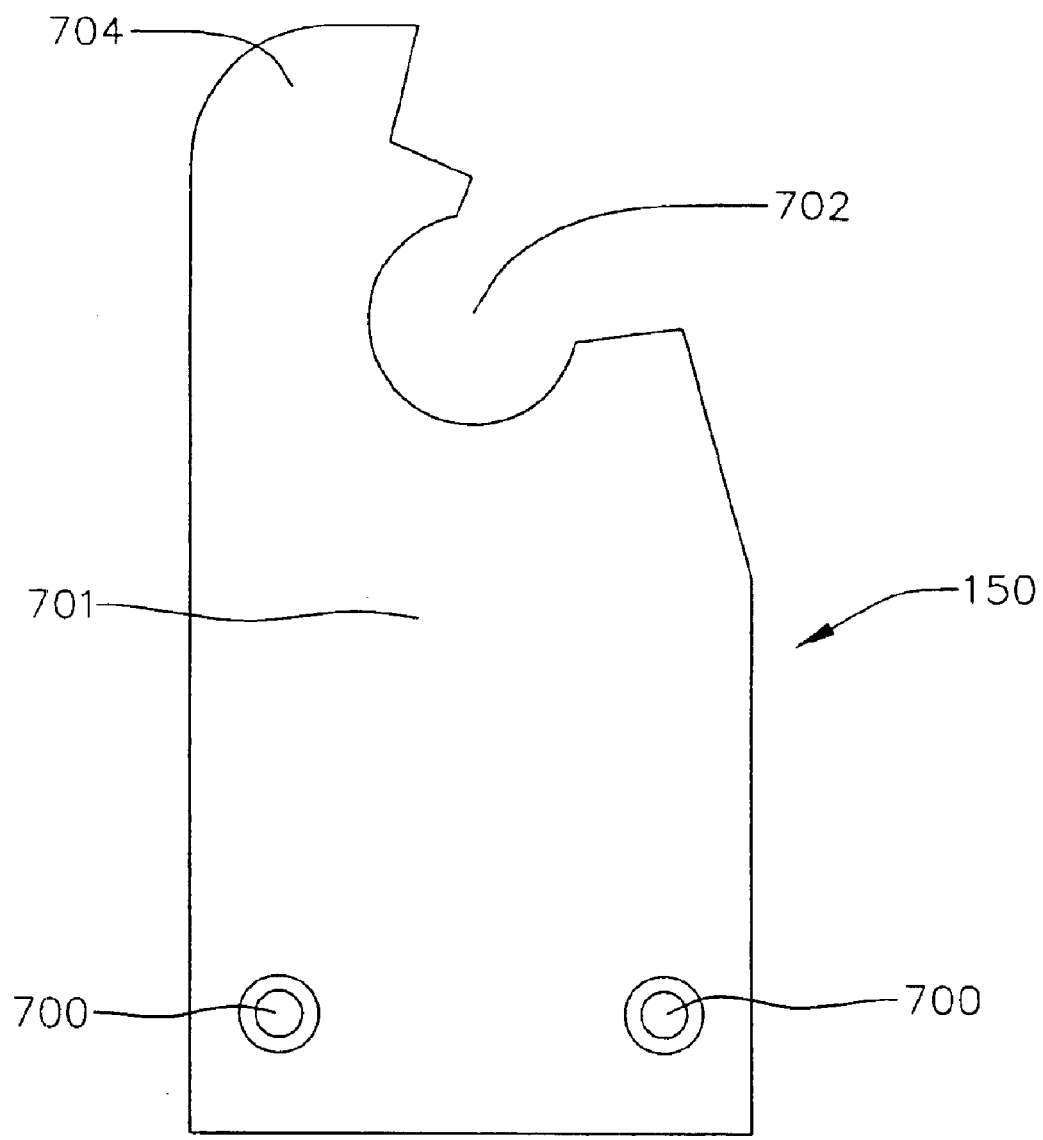
FIG. 7 illustrates one configuration of a push plate used to eject a rolled food item from the slotted spool.

FIG. 7 illustrates the push plate 120 in further detail. The push plate includes two mounting holes 700 for connection to the two shafts or cylinders 122 of the ejection actuator. The plate is designed to eject the rolled food item from the slotted spool. It can be designed in many different ways, one of which is illustrated in FIG. 7. For example, the bottom portion of the push plate includes a partially open aperture 702 with a diameter sufficiently wide to accept the slotted spool. As a result, the slotted spool can freely rotate without interference from the plate.

The bottom portion of the ejection plate also includes a lower lip 704 which extends around a portion of the bottom of the aperture 702. As a result, the upper portion 701 and lower lip 704 provide pressure to the top and bottom portions of the rolled food item to provide more distributed or equalized pressure against the side or body of the rolled food item.

Figure 8:
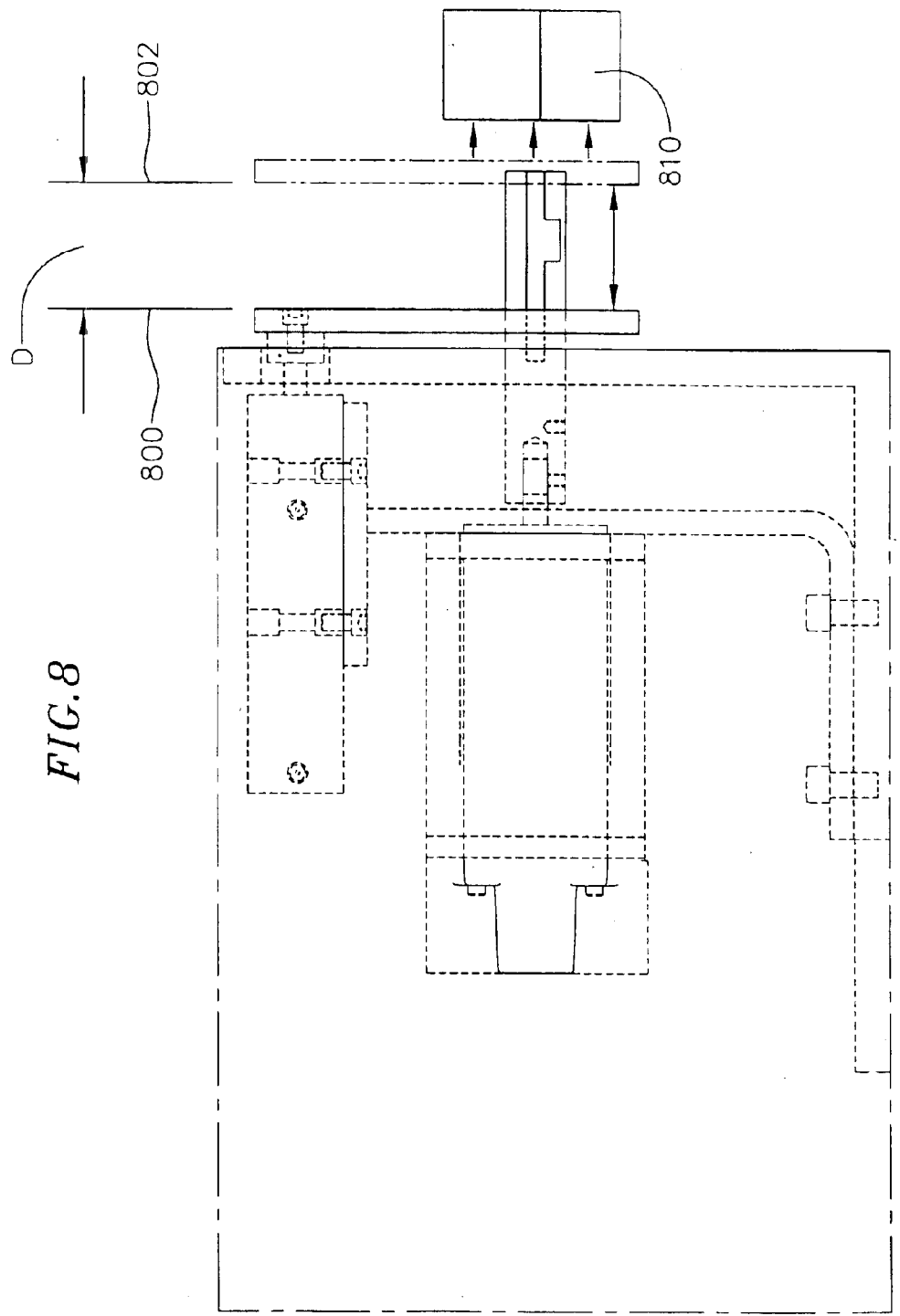
FIG. 8 illustrates the rolled food item being ejected from the slotted spool by an ejection actuator displacing a spool member and push plate.
Figure 9:
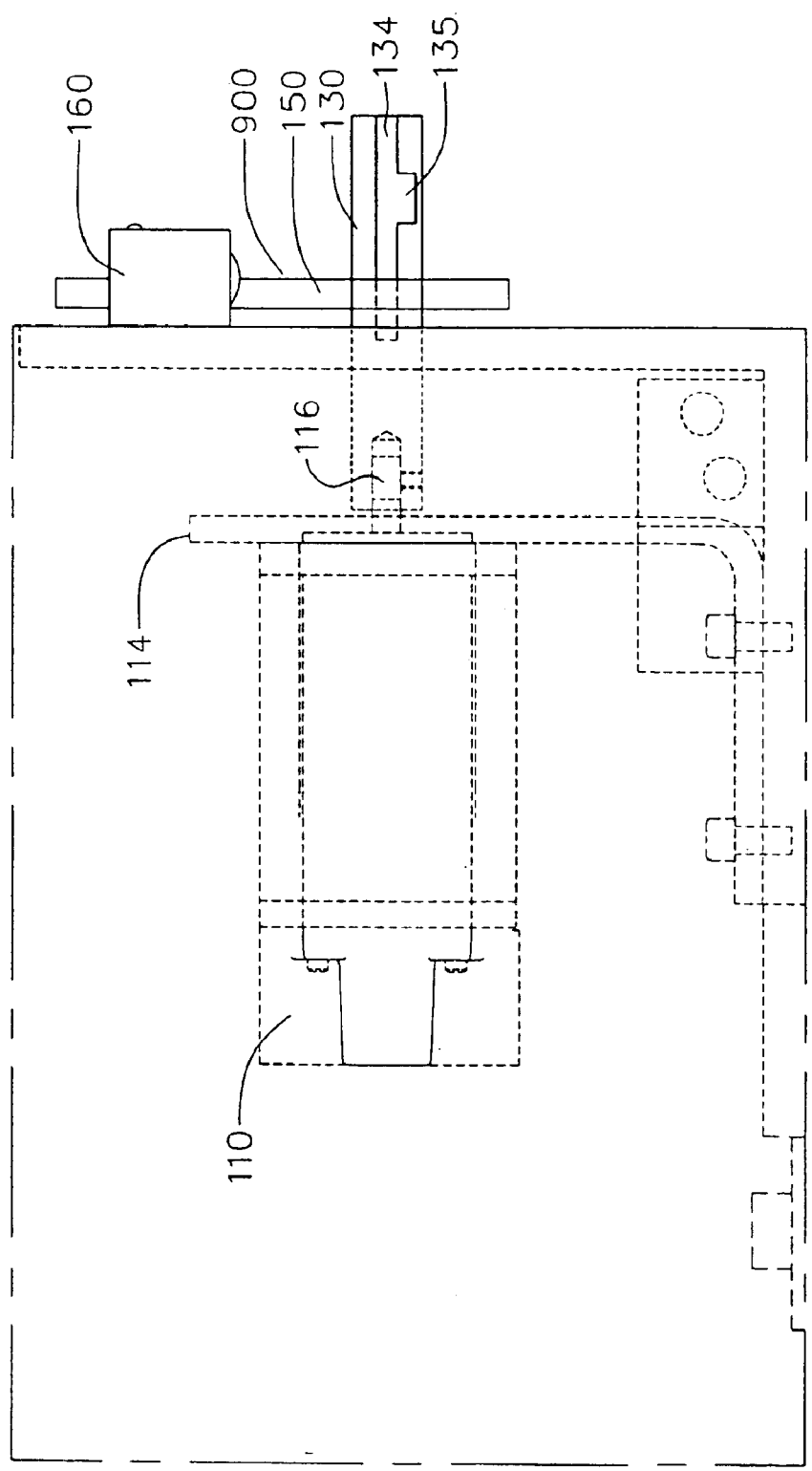
FIG. 9 illustrates a photoelectric sensor and associated spool and plate components.

Continuing with reference to FIG. 8, when the winding unit is at rest or in the process of forming a rolled food item, the push plate ISO is normally in a home position 800, i.e., positioned against the side wall or surface of the winding unit housing. In this state, the ejection actuator 120 has not displaced its cylinders 122. As a result, the push plate 150 does not interfere with the rotation of the slotted spool 130 or the deflection of the guide 140 since the push plate 150 is positioned to the side of these components. Further, aperture 202 permits the spool to rotate therein.

However, after a predetermined number of revolutions or degrees of rotation of the motor shaft 126 and/or slotted spool 130, the ejection actuator 120 is activated by the micro-controller 170. For example, the ejection actuator can be activated after about 2 to about 20 revolutions, one example being about 5 revolutions, depending on the diameter of the spool. The ejection actuator displaces its cylinders 122 and push plate 150 connected thereto to the stroke distance D, i.e., an ejection position 804. As a result, the push plate 150 ejects the rolled food item 810 from the spool 130 to a discharge conveyor positioned below.

After ejecting the rolled product 810 from the spool 130, the ejection actuator 120 and push plate 150 return to the home position 800, and the process repeats for additional rolled food items as necessary.

Having described the mechanical/electro-mechanical components of the winding unit 100 and their general operation, there follows a more detailed description of the electrical components that control these mechanical/electro-mechanical components. These electrical components include the sensor 160 for detecting the leading end of a supported food strip and the micro-controller 170 for controlling the operation of the motor 110, ejection actuator 120, and other components and operating parameters.

Sensor

Referring to FIGS. 9 and 10A–D, the edge detection sensor or photoeye 160 is positioned above the aperture 410 of the guide 140. The sensor 160 produces a beam 900 and detects the leading end of a supported food strip. Many different sensors can be used for this purpose, one example being a photoelectric infrared sensor, part no. 42BA-S2LPAC-A2, which is also available from Allen-Bradley.

Referring back to FIG. 1A or 4A, the guide plate includes a sensor aperture 410 to permit the beam 900 to pass through the guide 140. When the leading end of a supported food strip passes over aperture 410, it breaks the beam 900 from the sensor 160. As a result, the sensor 160 detects the leading end, and generates a presence signal in response thereto. The presence signal indicates to the micro-controller 170 that the leading end has passed a predetermined point or location, e.g., aperture 410 of guide 140.

Micro-Controller

The micro-controller 170 controls the operating parameters of the winding unit 100 components and can be programmed to control different operating parameters and settings.

For example, when sensor 160 generates the presence signal indicating the detection of the leading end, the micro-controller 170 is triggered to activate the motor 100 after a delay period to permit the leading end to continue over the guide plate 140, and into the slot 134 of the spool 130. An exemplary time delay is 100 ms if the supported food strip is being transported by a supply conveyor at about 1 foot per minute (fpm) to about 40 fpm, one example being about 35 fpm. After the time delay, i.e., after the leading end has entered the slot 134, the micro-controller activates the motor, thereby rotating the shaft and slotted spool to form the rolled food item. Further, persons of ordinary skill in the art will recognize that one or more microcontrollers can control one or more roll-up units. For example, although this specification refers to one micro-controller 170, alternatively, one micro-controller can control one group of roll-up units (e.g., 12 units), and a second micro-controller 170 can control a second group of roll-up units (e.g., 12 units).

FIGS. 10A–D illustrate the manner in which the sensor 160 and micro-controller 170 are utilized to control the rotation of the motor 110 and spool 130 to form a rolled food item.

Figure 10A:
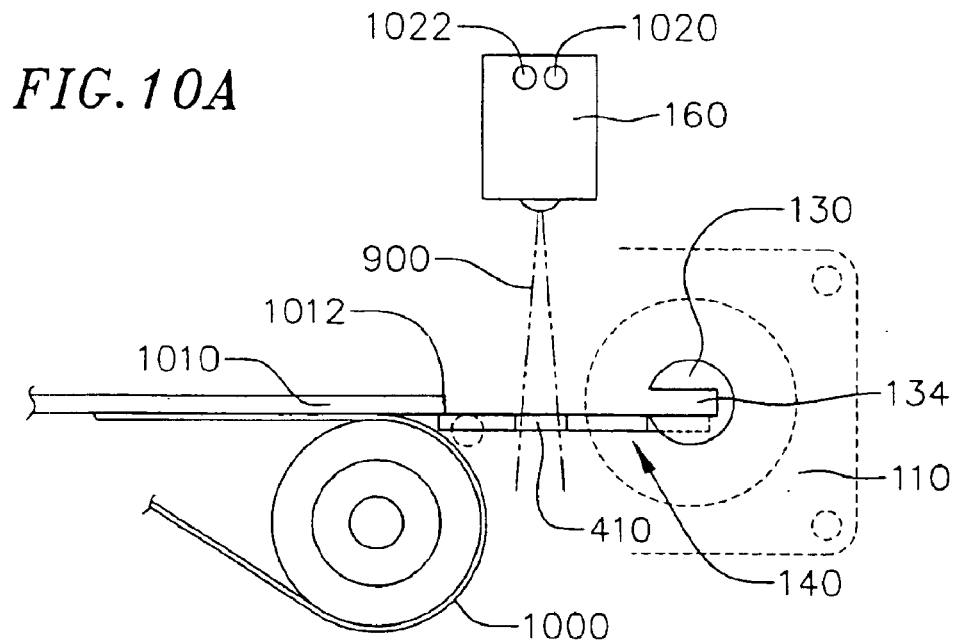
FIGS. 10A–D illustrate the manner in which a rolled food item is formed.

First, with reference to FIG. 10A, the winding unit is in its home position. The roll-up or supply conveyor 1000 is either inactive or in the process of transporting a supported food strip before the sensor 160. In addition, the motor 110, ejection actuator 120, and the slotted spool 130 are at their home positions. Further, the spring loaded guide 140 is not deflected since there is no rolled food item to deflect the guide 140.

Thus, FIG. 10A illustrates the leading end 1011 of the supported food strip 1010 being transported by the supply conveyor 1000, but not so far enough to break the sensor beam 900. As a result, the signal from the sensor 160 indicates that the leading end 1012 has not been detected. An edge detection light emitting diode (LED) 1020 can be illuminated in an amber color to indicate that the leading end has not been detected. In addition, a LED 1022 can indicate power to the winding unit.

Figure 10B:
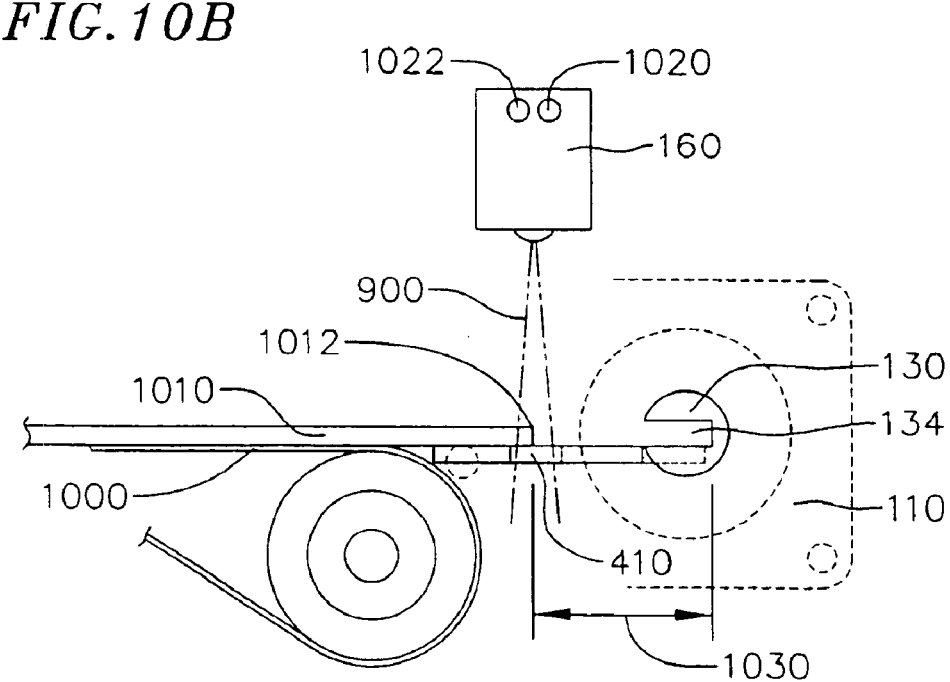

Next, with reference to FIG. 10B, the leading end 1012 is transported by the roll-up conveyor 1000, onto the guide plate 140. The leading end breaks the beam 900 of the sensor. In response, the sensor 160 generates the presence signal and provides this signal to the micro-controller 170. Detecting the leading end 1012 can also be indicated by a green edge detection LED 1020.

However, in this exemplary design, the motor 110 does not immediately begin rotating upon detection of the leading end 1012. Rather, the presence signal indicates to the micro-controller 170 that the motor is activated after a delay period 1030 (e.g., 100 ms) to permit the leading end to enter the slot. Thus, FIG. 10B illustrates the motor 110, ejection actuator 120, spool 130, guide 140, and push plate 150 in their home positions, since the leading end 1012 has just been detected.

Figure 10C:
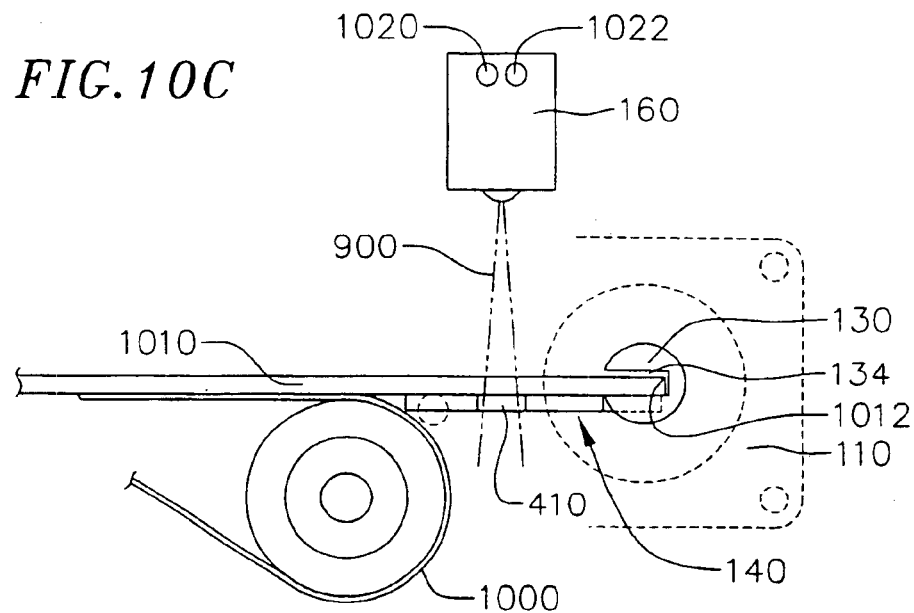

Next, with reference to FIG. 10C, the conveyor 1000 continues to transport the food strip 1010 across the guide plate 140. The leading end 1012 enters the slot 134. After the delay period 1030 has expired and the leading end 1012 enters the slot 134, the motor 110 is activated to rotate the slotted spool 130 with the leading end 1012 therein. An index cycle begins in which the motor 110 and/or spool 130 rotate for a predetermined number of revolutions.

Figure 10D:
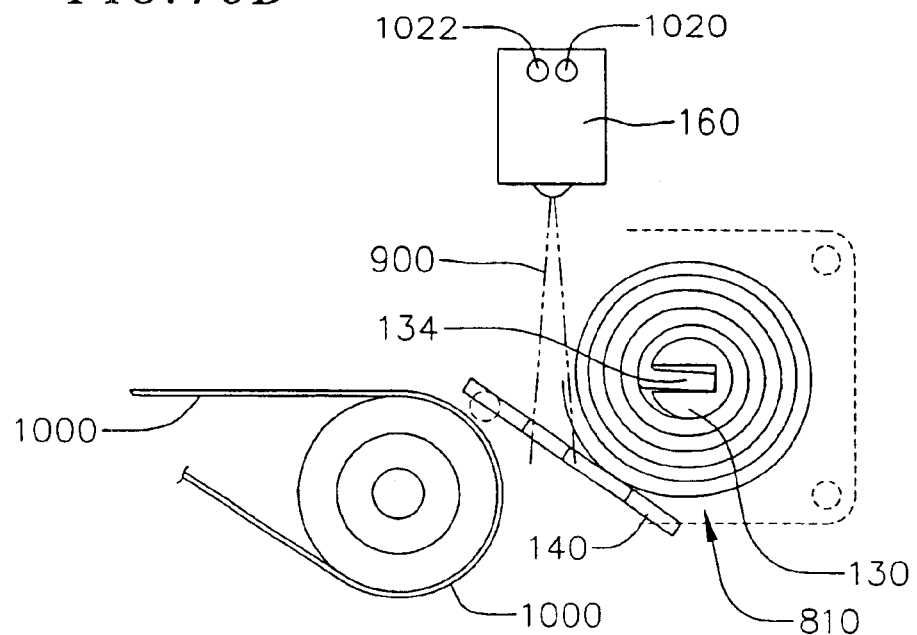

Finally, with reference to FIG. 10D, the motor 110 and slotted spool 130 have rotated their respective predetermined number of revolutions to form a rolled food item 810. As a result, the guide 140 is deflected downward as the rolled food item 810 is formed. After the predetermined number of revolutions, a control circuit of the motor issues a signal to the micro-controller that the index cycle has completed. The micro-controller 170 activates the ejection actuator 120 to displace the push plate 150 from its home position to the stroke distance D. The rolled food item 810 is then ejected from the spool 130 and falls to a discharge conveyor located below (not illustrated).

Besides controlling the motor and ejection actuator, the micro-controller 170 can also control other aspects of the winding unit. For example, the micro-controller can be programmed with different delay periods 1030 depending on the speed of the roll-up conveyor 1000. Further, the micro-controller 170 can be programmed to activate the motor 110 for different numbers of revolutions to form a rolled food item with different numbers of layers. The number of revolutions can also be adjusted depending on the thickness of the support material and food item. Additionally, the micro-controller 170 can control when the ejection actuator 120 is initiated to displace the cylinders 122 a stroke distance D to eject the rolled food item from the spool with the push plate.

These and other control aspects are further explained with reference to a system including one or more of the previously described winding units.

Food Winding System

Figure 11A:
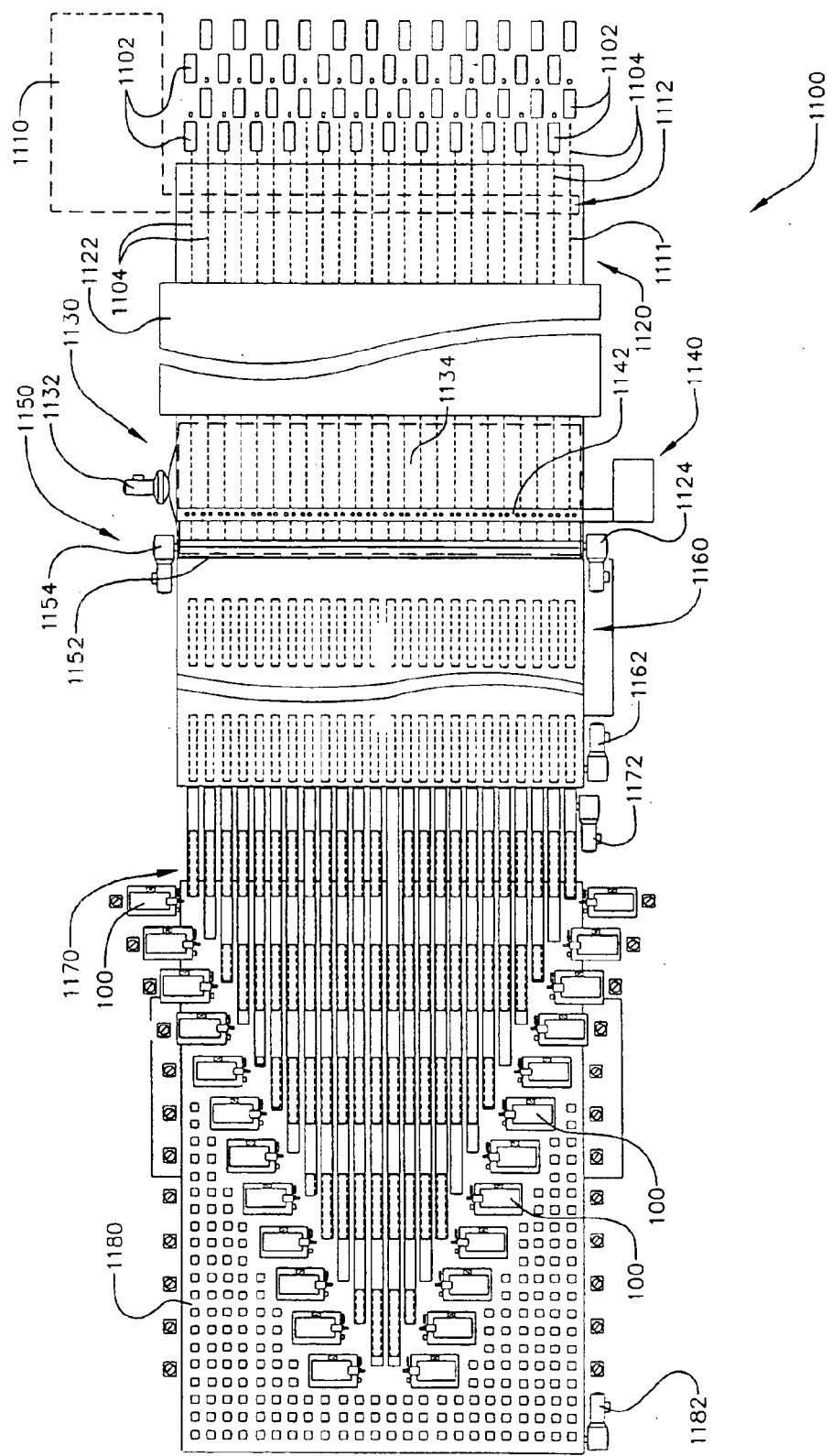
FIGS. 11A–B are respective top and side views of a system including a plurality of winding units and other system components associated with forming rolled food items.
Figure 11B:
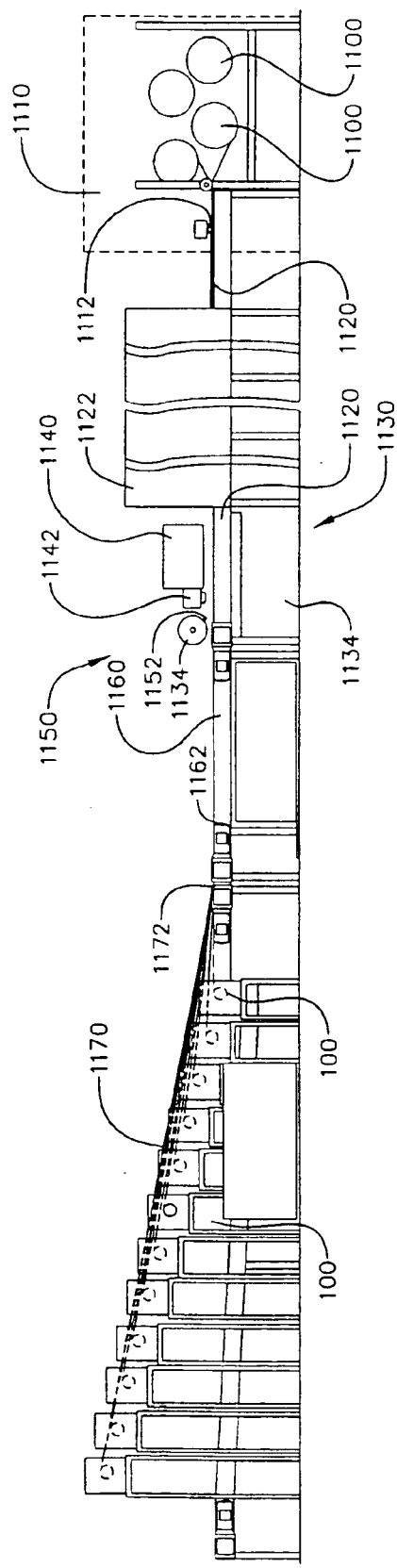

One or more winding units 100 can be incorporated into a system for producing a rolled food item. One example system is illustrated in FIGS. 11A–B. FIG. 11A illustrates a top view of one embodiment of the winding system 1100, and FIG. 11B illustrates a side view of the same system.

With reference to FIG. 11A, the system 1100 includes 24 food winding units 100. Indeed, those skilled in the art will recognize that many different numbers of food winding units 100 can be utilized, and a system with 24 units 100 is illustrative of many configurations that can be used.

In this embodiment, the winding system 1100 includes: 24 supply reels 1102 with support material or strips 1104, an extruder 1110 with heads or ports 1112 through which food is deposited on support strips 1104 positioned below respective heads 1112, a cooling conveyor system 1120, a cooling tunnel 1122 (if necessary), a vacuum system 1130, a glue system 1140, a cutting system 1150, a spacing conveyor system 1160 (if necessary), a roll-up conveyor system 1170, winding units 100 at the end of the roll-up conveyor system 1170, and a discharge conveyor system 1180 to transport rolled food items ejected from the winding units 100.

Supply Reels

Twenty-four support strips 1104 from 24 supply reels 1102 (or spare reels) are directed under the extruder 1110. In the event that a supply reel 1102 is almost empty, a sensor which monitors the support material remaining on a primary or spare supply reel can alert a user that new supply reels are needed.

Extruder

Extruders which deposit food items are well known. Various types of extruders 1110 can be used with the food winding system 1100, one example being a side flow extruder. The extruder deposits a food item 1111 through 24 extruder heads or ports 1112 onto respective support strips 1104 which pass below each head 1112 along the cooling conveyor system 1120. For example, a support strip can have a thickness of about 0.010" to 0.1", one example thickness being 0.020". The support strip can have a width of about 0.35" to about 24.2", one example width being 1.125". The food can be dispensed by the extruder at a temperature of about 100° F. to about 240° F., one example temperature being 200° F. The thickness of the food can be about 0.25" to about 24", one example food thickness being about 0.062". The width of the food can be about 0.25" to about 24.0", one example being about 0.75" (narrower than the width of the support strip).

The extruder 1110 provides flexibility in the manner in which food is deposited onto the support strip 1104. For example, the extruder 1110 can be set to deposit food 1111 in a continuous manner onto continuous support strips 1104 as previously described. Alternatively, the support material 1104 can be perforated such that strips of support material are released from supply reels 1102 into strips of a predetermined length. The lengths may or may not include spaces therebetween. If there are no spaces between the pre-cut lengths of support strips, the extruder 1110 can continuously deposit food onto the strips. If, however, the supply reels 1102 are configured to release spaced strips onto the conveyor, then the extruder 1110 can be controlled to periodically deposit food 1111 onto the spaced support strips 1104 in order to maintain the timing of depositing food onto a support strip. Thus, the extruder 1110 can be controlled to periodically or continuously deposit food 1111 onto support strips. 1104 depending on the design and required timing.

Moreover, the extruder 1110 provides flexibility in the type of food 1111 that is wound into a rolled food item. For example, one extruder 1110 can provide a food item 1111 to ports 1–12, whereas another extruder 1110 with another food item 1111 can provide its food item to ports 13–24. An extruder can also be partitioned such that different heads deposit different types of food. Thus, the system is flexible and can produce different rolled food items. Further, the extruder 1110 can be used to controllably mix ingredients and colors, further enhancing the capability of the winding system.

Cooling Conveyors and Tunnel

The supported food strips are transported by the cooling conveyors 1120, and the food item cools while moving along the cooled conveyor surfaces, e.g., at 1 foot per minute (fpm) to about 40 fpm, one example being about 35 fpm. The cooling conveyors can be cooled using, for example, cooling plates at a temperature of about 55 to 65 degrees F. The total length of the cooling conveyors from the extruder to the rotary knife can be about 100 feet. The food 1111 is cooled to a temperature of about 60° F. to about 120° F., one example being about 70° F. Of course, different cooling temperatures and cooling durations can be selected depending on the speed of the cooling conveyor 1120, the type of food item(s) 1111, and the desired cooling effect. Further, if necessary, a cooling tunnel 1122 can be utilized for enhanced cooling effects.

Vacuum Alignment

Upon exiting the cooling tunnel 1122, the supported food strips are transported by the cooling conveyor 1120 to a vacuum system 1130. An exemplary vacuum system includes a vacuum pump 1132 (e.g., a 2.0 horsepower vacuum pump) and vacuum plenum or ports. 1134 below the cooling conveyor 1120. The pump 1132 creates a vacuum through the ports 1134. Thus, when the supported strips of food enter the vacuum section, they are aligned in lanes as a result of the suction generated by the pump through ports 1134 upon the bottom of the support material.

Glue System

An adhesive or glue is applied to the trailing end of the length of supported food strip using a glue system 1140. In a preferred embodiment, the adhesive is edible, e.g., a drop of an edible food grade adhesive such as cornstarch, is applied to the trailing end of each strip through nozzles 1142 and secures the food strip to the back of the support strip when a rolled food item is formed. Other edible adhesives, such as moisture or water, can also be utilized depending on the food strip composition and support strip material. This technique is advantageous because it is not necessary to remove labels or other non-edible adhesives from the rolled product. Of course, a label and other different adhesives can also be utilized, or the food may be sufficiently cohesive that this is unnecessary.

Cutting System

To this point, the supported food strips have been chilled, aligned, and received an adhesive. Assuming the extruder deposits a continuous strip of food onto a continuous support strip, the supported food strip is also continuous. The strip is then cut by the cutting system 1150.

The exemplary cutting system 1150 includes a rotary knife 1152 driven by a knife motor 1154. The rotary knife 1152 includes a single blade which rotates about a shaft and extends across the cooling conveyor 1120, i.e., across the width of the strips of supported food. Thus, as each of the 24 continuous strips of food pass under the rotary knife 1152, each strip is cut to a predetermined length.

Of course, those skilled in the art will recognize that other knife configurations can be utilized. For example, instead of a single blade, multiple blades can be used to cut a supported strip of food into predetermined lengths. Further, the rotation speed of the knife 1152, the speed of the cooling conveyor 1120, or a combination of the rotation speed of the knife and speed of the cooling conveyor can be adjusted to cut the supported food strip into different lengths. Moreover, a slicing mechanism can be utilized instead of a rotary knife. With this configuration, a blade can traverse the width of the conveyor, cutting each strip to a predetermined length. In the slicing configuration, the conveyor can be momentarily paused to complete the slicing action.

In an alternative embodiment in which the supply reel 1102 is perforated to provide predetermined lengths of support material under the extruder, the rotary knife is not needed since the strips are already cut or perforated to a predetermined length. In fact, no cutting mechanism is necessary in this embodiment since the support strips from such supply reels are also pre-cut to a predetermined width.

The predetermined length is preferably consistent for each of the 24 winding units 100 to simplify the configuration and control of the other components. For example, a continuous supported strip of food can be cut by the rotary knife 1152 into lengths of about 6" to 72", one example being 36".

Once the predetermined length is selected, the parameters of other components can be set, e.g., the number of rotations of the motor/slotted spool to wind the food strip.

Spacing Conveyors

One embodiment of the system utilizes a spacing conveyor that runs faster than the vacuum conveyor to create gaps between strips of food items after they are cut into predetermined lengths. The spacing conveyors 1160 which are driven by a spacing conveyor motor 1162. The length of the spacing conveyors is about 4 feet. The spacing conveyor 1160 runs at a higher speed than the cooling conveyor 1120. As a result, when lengths of supported strips of food are transferred to the spacing conveyors 1160, the leading length proceeds at a faster rate compared to a trailing length. Consequently, a space develops between the leading and trailing lengths of supported food strips in the same lane or on the same conveyor.

Thus, larger spaces between lengths of supported food strips can be formed by increasing the speed differential between the spacing conveyor 1160 and cooling conveyor 1120. For example, the spacing conveyor can transport the predetermined lengths of supported food strips about 15% faster than the cooling conveyor.

Persons of ordinary skill in the art will recognize that spaces between cut strips of food item can be generated in other ways. For example, in an alternative embodiment, the system does not utilize a spacing conveyor. Instead, the speed of the rolling process can be increased so that a sufficient gap between the strips of food is created to allow sufficient time for the roll-up unit to reset for the next roll-up sequence.

Roll-up/Supply Conveyors

The lengths of supported food strips are directed to winding or roll-up conveyors 1170 which are driven by a winding conveyor motor 1172, and then to respective winding units 100. The roll-up conveyors can be transported at a speed of about 1 foot per minute (fpm) to about 40 fpm, one example being about 35 fpm, similar to the cooling conveyor.

In the embodiment illustrated in FIG. 11A, a top view of the system, winding units 100 are arranged in a triangular or V-shaped configuration. More specifically, this arrangement includes 24 winding units offset by, for example, 12 inches. Of course, different offsets can be utilized. The lengths of the roll-up conveyors can vary due to the offset positions, and can range from about 40" to about 162" in length with 12" offsets between each winding unit. The spacing of the winding units 100 enables the supported strips of food to be wound without interference from other winding units.

The exemplary triangular or V-shaped configuration of the system is illustrated in FIG. 11B. The winding units 100 are also arranged at different elevations. For example, adjacent conveyors can have about a 2" height differential. Again, this reduces or prevents interference between winding units. The variations in the lengths of the roll-up conveyors are due, in part, to the vertical rise and horizontal length of individual conveyors at the downstream end and to provide sufficient space for the push plate and ejection of the rolled product from the spool.

Discharge Conveyors

As discussed earlier, each winding unit forms a rolled food item with the slotted, rotating spool or cup. Then, the rolled food item is ejected from the spool by the push plate displaced by the ejection actuator. The rolled food item then falls onto a discharge conveyor 1180 which is driven by a discharge conveyor motor 1182. The rolled food items can then be routed to other processing or packaging systems.

Figure 12A:
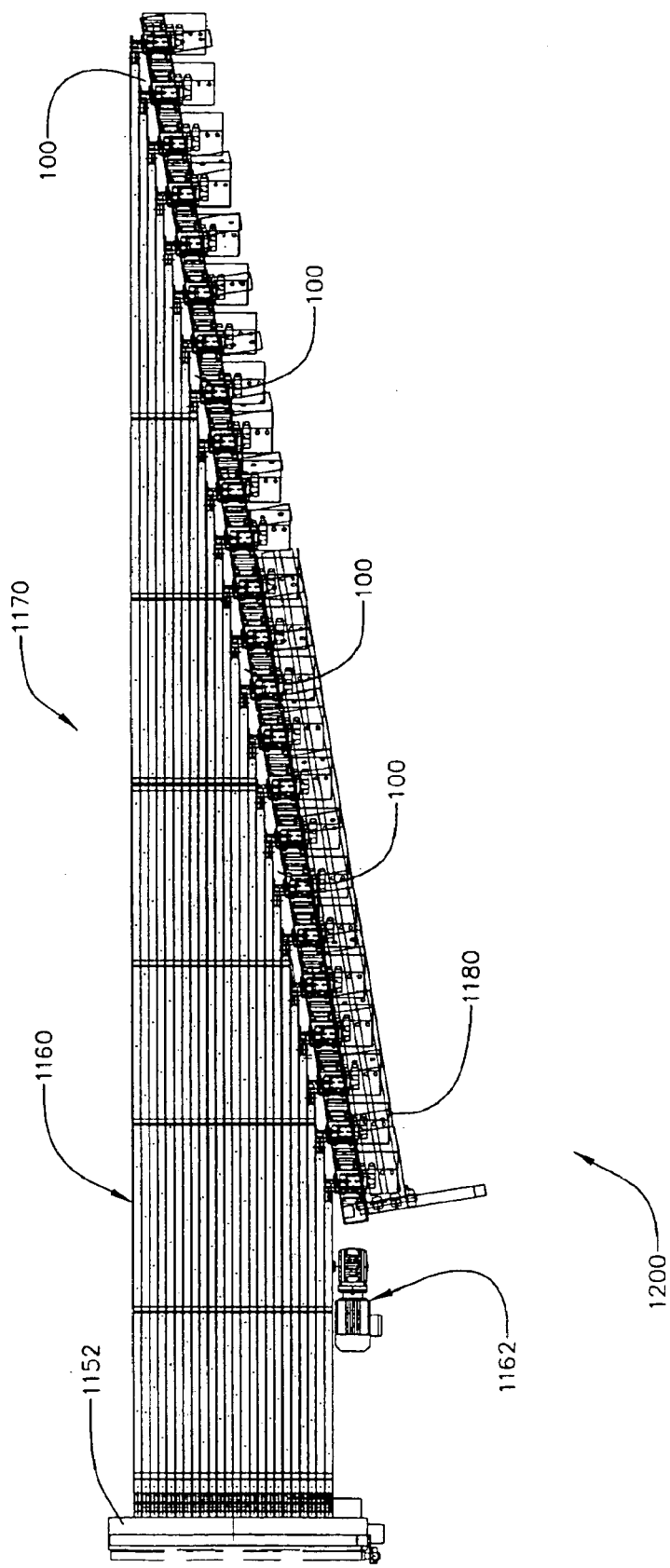
FIGS. 12A–B are respective top and side views of an alternative system configured with roll-up units arranged on one side of a roll-up conveyor.
Figure 12B:
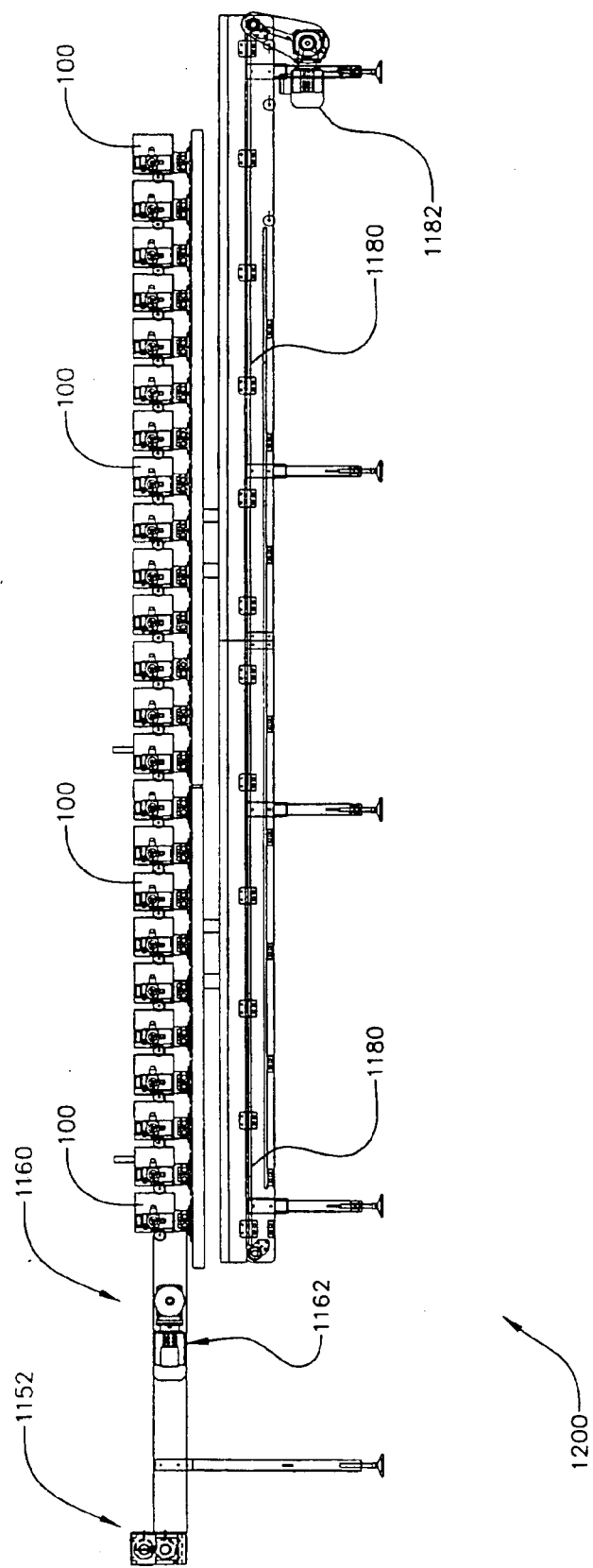

Persons of ordinary skill in the art will recognize that other system configurations besides the "elevated V" configuration shown in FIGS. 11A–B can be used. For example, referring to FIGS. 12A–B, in an alternative embodiment of a winding system, the winding units 100 can be arranged on one side of the roll-up conveyor 1170 instead of arranged across the roll-up conveyor in a "V" design. In this alternative embodiment, the discharge conveyor 1180 is positioned below the winding units 100 so that the rolled food item can be ejected from the spool by the push plate and fall onto the discharge conveyor 1180 below. Thus, 24 conveyor lanes can be used to produce 24 rolled food products in a narrower area, e.g., in approximately a width of 35", whereas one embodiment of the "V" embodiment shown in FIGS. 11A–B uses a width of about, e.g., 45" to 65". Additionally, in it is not necessary to elevate the roll-up units.

Figure 13:
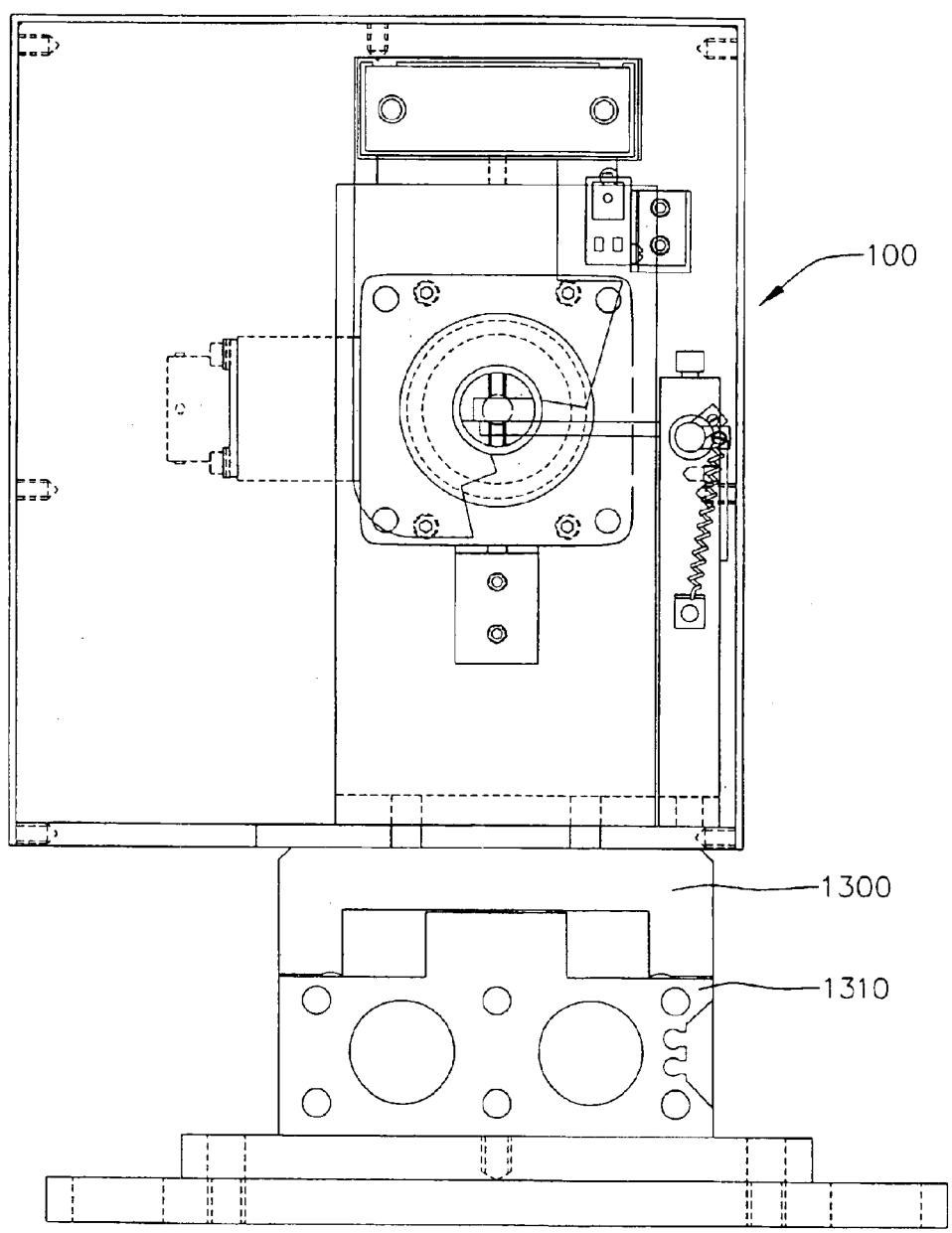
FIG. 13 is a front view of a rolling unit mounted on a displaceable base slide to slide a rolling unit away from its associated conveyor lane.

Also in connection with the alternative embodiment previously described, referring to FIG. 13, the base of one or more of the winding units 100 can be attached to a slide base 1300. The slide base 1300 is displaced by a cylinder (not shown in FIG. 13) of a slide actuator 1310 (e.g., a Bimba Manufacturing Co. actuator as previously described). The slide base 1300 under each winding unit 100 can be displaced by the slide actuator 1310 to retract the roll-up unit 100. More specifically, the rolled food product is wound around the spool as previously described. The roll-up unit 100 can be displaced away from its associated roll-up conveyor lane when the micro-controller activates the slide actuator 1310 so that its cylinder and the base 1300 connected thereto are displaced. The slide base 1300 and the winding units are displaced from an initial or winding position to a retracted position at the actuator's stroke distance. The ejection actuator 120 coupled to the push plate is then activated to eject the rolled food item from the spool. The slide actuator 1310 and the base slide 1300 then return to their initial positions. As a result of sliding the winding unit back before the rolled food item is ejected, the ejected rolled food item falls in front of its own conveyor. Thus, the winding and food item ejection process can be completed within a narrower area.

Having described the general operation of a food winding unit 100 and a systems 1100 and 1200 utilizing multiple winding units 100, the following sections provide further details about the method of forming a rolled food item.

Method of Forming Rolled Food Items

Following is a description of the steps performed for producing a plurality of rolled food items. This method can be utilized to form a single product or different numbers of products.

Figure 14:
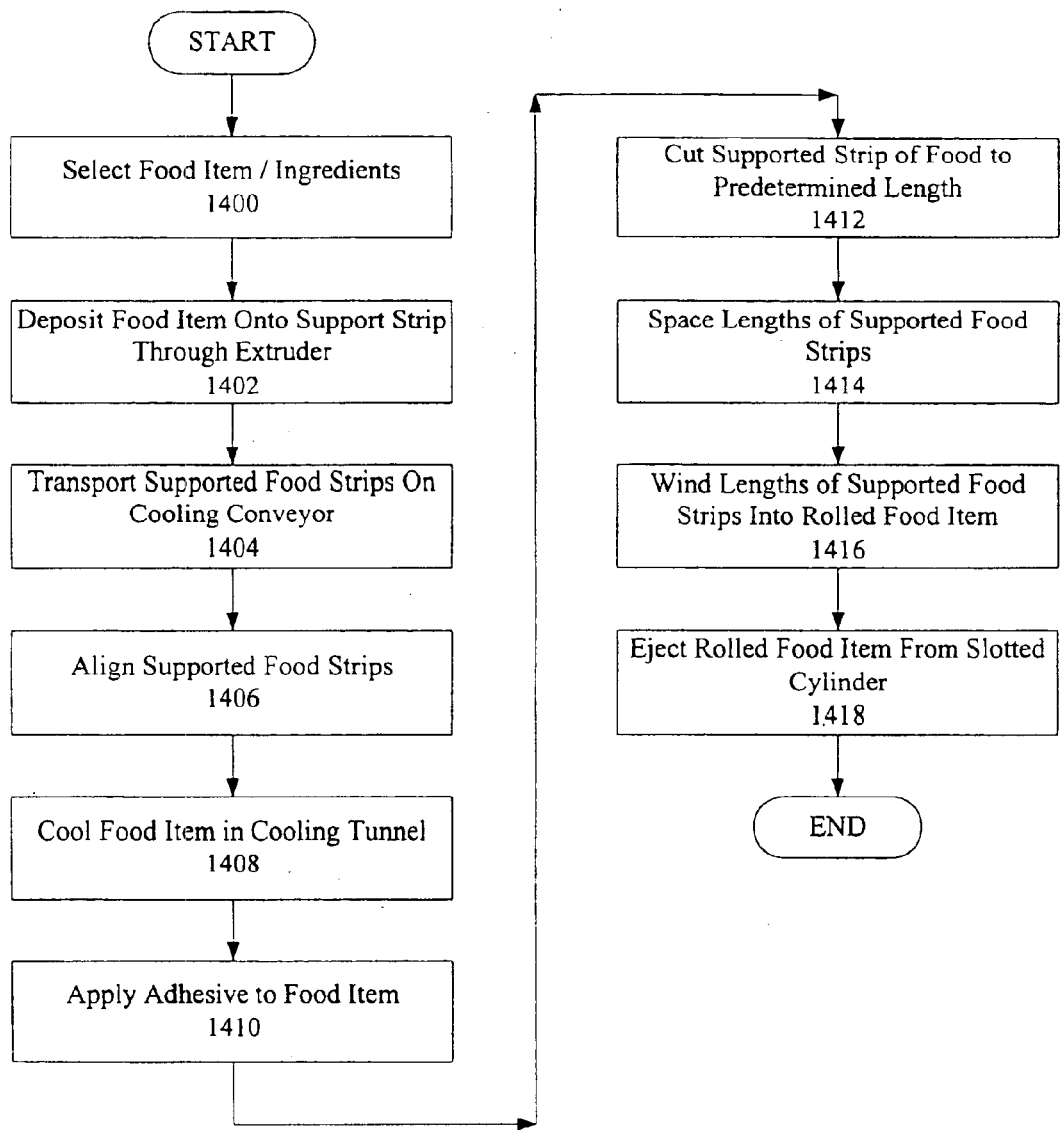
FIG. 14 is a flow diagram describing the method of forming a rolled food item.

Referring to the flow chart of FIG. 14, in step 1400, the type of food item to be rolled into food items is selected. That food item, or combination of food items (e.g., different ingredients, colors, flavorings, etc.) is added to an extruder or other food depositing machine.

Next, in step 1402, the food item(s) is deposited through one or more extruder heads onto support strips positioned below the extruder heads. For example, the support strips can be one of many different food grade flexible support materials including, but not limited to, silicone coated paper, cellophane, and polyethylene having a thickness from about 0.010" to about 0.1", one example thickness being about 0.020", and a width from about 0.35" to about 24.21", one example being about 1.125". The food can be dispensed by the extruder at, for example, a temperature from about 100° F. to about 240° F., one example being about 200° F., with a thickness from about 0.04" to about 0.5", one example being about 0.062", and a width of about 0.25" to about 24", one example being about 0.75".

Continuing with step 1404, the supported food strips are transported by the cooling conveyor at a rate of about 35 feet per minute (fpm). Other speeds can be used depending on the settings of other related components. In step 1406, the supported food strips are aligned using, for example, a vacuum system.

In step 1408, the supported food strips are transported by the cooling conveyor through a cooling tunnel which cools the food from about 200 degrees Fahrenheit to about 70 degrees Fahrenheit. Upon exiting the cooling tunnel, in step 1410, an adhesive is periodically applied to the food. The adhesive can be cornstarch or another edible adhesive that attaches the food item to the backing or support material. Of course, a label can also be utilized.

At this point, the supported food strips have not been cut. Rather, the strips are continuous and food is deposited upon the strips in a continuous manner. Thus, the drops of cornstarch can be applied periodically, e.g., applied about 1 inch from the cuts—on the trailing ends of the eventual lengths of supported food. In the exemplary embodiment involving 36 supported food strips, the drops of cornstarch or other edible adhesive are applied every 36" and 1" from what will be the trailing ends of the lengths of supported food. Of course, the cornstarch can be applied at different intervals depending on the food product. Then, in step 1412, the supported food strips are cut to lengths with the rotary knife or other cutting mechanism.

Those skilled in the art will recognize that it is not necessary to perform these method steps in the order recited above. For example, the drops of cornstarch or other edible adhesive can be applied to the trailing ends of lengths of food after the continuous strips are cut.

Figure 15:
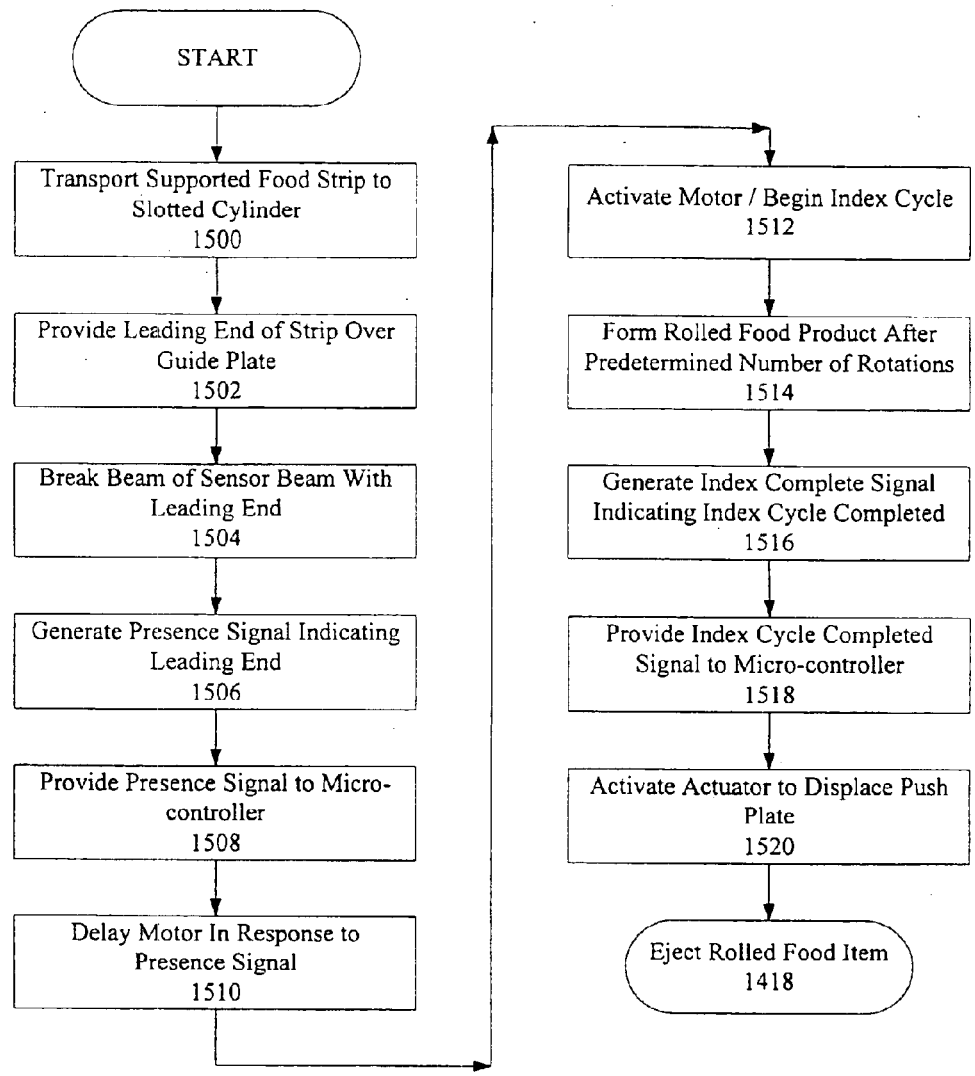
FIG. 15 is a flow diagram describing the method of rolling a supported strip of food around a slotted spool.

Continuing with step 1414, the lengths of supported food strips are spaced using spacing conveyors. Spacing the strips in this manner provides time, for the winding units to wind the strips into rolled products without interference from other strips. Next, in step 1416, the lengths of supported food strips are wound into rolled food items. Then, in step 1418, the rolled products are ejected from the spools and provided to discharge conveyors for further processing. (FIG. 15 is a flow chart providing further details relating to step 1416, winding a strip of food into a rolled food item using a winding unit 100.)

In step 1500, the roll-up conveyor transports the supported food strips towards the slotted spool. In step 1502, the strip is further transported such that the leading end is provided to the guide plate between the end of the roll-up conveyor and the slotted spool. Then, in step 1504, the leading end passes over the sensor aperture of the guide plate, thereby breaking the beam of the sensor. As a result, in step 1506, the sensor generates a presence signal indicating that the leading end has reached a location breaking the beam of the photosensor.

Then, in step 1508, the presence signal is provided to the micro-controller. In step 1510, the micro-controller implements a delay before activating the motor to permit the leading end to traverse the guide plate and enter the slot of the spool. In step 1512, after the delay has expired and the leading end has entered the slot, the micro-controller activates the motor and begins an index cycle, thereby rotating the motor shaft and slotted spool coupled thereto. In step 1514, the motor shaft and slotted spool rotate for a predetermined number of revolutions to form the rolled food item. Then, in step 1516, the motor control circuit generates a signal indicating an index cycle has been completed.

In step 1518, the index cycle complete signal is provided to the micro-controller. In step 1520, in response to the index cycle complete signal, the micro-controller activates the actuator. As a result, actuator cylinders and the push plate coupled thereto are displaced to a stroke distance D. Then, continuing with step 1518, the rolled food item is ejected from the slotted spool by the push plate.

Those skilled in the art will recognize that the above methods can be utilized with a single winding unit or with a system including one or a plurality of winding units as previously described. Although references have been made in the foregoing description to various embodiments, persons of ordinary skill in the art of designing food winding units and related systems will recognize that insubstantial modifications, alterations, and substitutions can be made to the described embodiments without departing from the invention as claimed in the accompanying claims. Thus, while the preferred embodiment is described as utilizing a slotted spool and a push plate to eject the rolled food item from the slotted spool, those skilled in the art will recognize that other similar mechanisms can also be utilized.

Further, persons of ordinary skill in the art will recognize that many variables in the system of winding units can be selected to accommodate different operating parameters, e.g., speeds of cooling, spacing, and roll-up conveyors, the cooling temperature of the cooling conveyor depending on the speed of the cooling conveyor, lengths of supported strips of food, time delay between detecting the leading end of a strip of food and initiating rotation of the motor and slotted spool, the number of rotations to form the rolled food item, the length and width of the food item, support strips, and resulting rolled food item, the stroke distance D of the pneumatic actuator, speed and number of blades of the rotary knife, and the design of the push plate, slot (e.g., pointed lips, bored inner diameters), and guide plate (e.g., tongue design to interface with slot of spool and spring tension), and the manner of controlling these components, as different operating parameters can be controlled through programming a micro-controller to implement the parameters. Further, various system configurations can be used, including arranging the winding units in an elevated "V" configuration or arranging the winding units on one side of the roll-up conveyor.

What is claimed is:

1. An apparatus for winding a supported strip of food having a leading end and a trailing end into a rolled food item, comprising:

a motor having a shaft which rotates when said motor is activated;

a spool having a slot, said spool being coupled to said shaft of said motor, whereby said slotted spool rotates when said motor is activated;

a guide positioned before said slot to direct the leading end of the supported food strip into said slot;

a sensor positioned above said guide to detect the leading end and to generate a presence signal in response thereto;

an actuator with a displaceable member;

a plate coupled to said displaceable member, said plate being positioned to permit said spool to rotate to form the rolled food item; and a control circuit associated with said motor, sensor, and actuator, said control circuit configured to activate said motor in response to said presence signal and to rotate said slotted spool a predetermined number of degrees to form the rolled food item and, after said predetermined number of degrees, and to activate said actuator to displace said plate and eject the rolled food item from said slotted spool.

2. The apparatus of claim 1, wherein said motor is activated to rotate said slotted spool about five revolutions to form the rolled food item.

3. The apparatus of claim 1, wherein said slot is formed through one side of said spool.

4. The apparatus of claim 1, wherein said spool includes a sharpened lip to engage the food.

5. The apparatus of claim 1, wherein said spool includes a sharpened lip to engage the food and an inner diameter to receive the supported food strip.

6. The apparatus of claim 1, wherein said slotted spool has a cylindrical outer surface.

7. The apparatus of claim 1, wherein said guide includes an aperture, and said sensor is positioned adjacent said aperture and generates a beam that passes through said aperture, and wherein said sensor detects the leading end by the leading end breaking the beam.

8. The apparatus of claim 1, further comprising a spring coupled to said guide, said spring being configured to place said guide in tension to maintain said guide in a position aligned with said slot.

9. The apparatus of claim 8, wherein said guide includes a flange, said slotted spool includes a groove about a perimeter of said spool; and said flange is received within said groove to align said guide with said slot of said spool.

10. The apparatus of claim 1, wherein said guide is deflected under tension by said spring as a result of the rolled food item being formed around said slotted spool.

11. The apparatus of claim 1, wherein said sensor comprises an infrared sensor.

12. The apparatus of claim 1, wherein said actuator comprises a pneumatic cylinder.

13. The apparatus of claim 1, wherein said plate includes an upper section which applies pressure against the top of the rolled food item and a lower section which applies pressure against the bottom of the rolled food item.

14. The apparatus of claim 1, wherein said control circuit comprises a micro-controller.

15. The apparatus of claim 1, wherein said control circuit activates said motor in response to said presence signal after a predetermined delay, said predetermined delay permitting the leading end of the supported food strip to enter said slot of said spool.

16. The apparatus of claim 15, wherein said predetermined delay comprises 100 ms when the supported food strip is being transported at about 35 feet per minute (fpm).

17. The apparatus of claim 1, wherein the rolled food item comprises a dehydrated fruit product.

18. The apparatus of claim 1, wherein the trailing end of the supported food strip is adhered to the rolled food item by a drop of an edible adhesive.

19. A system for winding one or more supported strips of food having a leading end and a trailing to form a rolled food item, comprising:
   an extruder configured to deposit food onto a support strip;
   a cutter to form predetermined lengths of supported food strips;
   a conveyor to transport said supported food strip; and
   a winding unit positioned at an end of said conveyor and configured to receive the leading end of the supported food strip, said winding unit including:
      a motor having a shaft which rotates when said motor is activated;
      a spool having a slot, said spool being coupled to said shaft of said motor, whereby said slotted spool rotates when said motor is activated;
      a guide positioned before said slot to direct the leading end of the supported food strip into said slot;
      a sensor positioned above said guide to detect the leading end and to generate a presence signal in response thereto;
      an actuator with a displaceable member;
      a plate coupled to said displaceable member, said plate being positioned to permit said spool to rotate to form the rolled food item; and
      a control circuit associated with said motor, sensor, and actuator, said control circuit configured to activate said motor in response to said presence signal and to rotate said slotted spool for a predetermined number of degrees to form the rolled food item and, after said predetermined number of degrees, to activate said actuator to displace said plate and eject the rolled food item from said slotted spool.

20. The system of claim 19, wherein said extruder deposits a continuous strip of food onto the support strip.

21. The system of claim 20, wherein the support strip has a width of about 1.25" and the deposited food has a thickness of about 0.062" and a width of about 0.75".

22. The system of claim 19, further comprising a cooling system to cool the food deposited by said extruder.

23. The system of claim 22, wherein said cooling system comprises a cooling tunnel through which the supported food strip is transported by said conveyor.

24. The system of claim 23, wherein the food is cooled in said cooling tunnel to a temperature of about 70 degrees F.

25. The system of claim 19, wherein said cutter comprises a rotary knife including a shaft extending the width of the supported food strip and at least one blade, said shaft and blade being rotated to cut said supported food strip to said predetermined length.

26. The system of claim 25, wherein said predetermined length comprises about 36".

27. The system of claim 19, wherein said conveyor comprises:
   a cooling conveyor positioned between said extruder and said cutter;
   a spacing conveyor positioned after said cooling conveyor, wherein said spacing conveyor is faster than said cooling conveyor resulting in said spacing conveyor producing spaces between predetermined lengths of supported food strips; and
   a winding conveyor positioned after said spacing conveyor to transport predetermined lengths of supported food strips.

28. The system of claim 27, wherein said cooling conveyor transports said supported food strip at about 35 feet per minute (fpm).

29. The system of claim 27, wherein said spacing conveyor transports said predetermined lengths of supported food strips about 15% faster than said cooling conveyor.

30. The system of claim 27, wherein said winding conveyor transports said predetermined lengths of supported food strips at about 35 feet per minute (fpm).

31. The system of claim 19, wherein said motor rotates said slotted spool for about five revolutions to form the rolled food item.

32. The system of claim 19, wherein said slot is formed through one side of said spool.

33. The system of claim 19, wherein said spool includes a sharpened lip to engage the food.

34. The system of claim 19, wherein said spool includes a sharpened lip to engage the food and an inner diameter to receive the supported food strip.

35. The system of claim 19, wherein said slotted spool has a cylindrical outer surface.

36. The system of claim 19, wherein said guide includes an aperture, and said sensor is positioned above said aperture and generates a beam that passes through said aperture, and wherein said sensor detects the leading end by the leading end breaking the beam.

37. The system of claim 19, further comprising a spring coupled to said guide, said spring being configured to place said guide in tension to maintain said guide in a position aligned with said slot.

38. The system of claim 37, wherein said guide includes a flange; said slotted spool includes a groove around a perimeter of said spool; and said flange is received within said groove for alignment of said guide plate with said slot of said spool.

39. The system of claim 19, wherein said sensor comprises a photoelectric infrared sensor.

40. The system of claim 19, wherein said actuator comprises a pneumatic cylinder.

41. The system of claim 19, wherein said plate includes an upper section which applies pressure against the top of the rolled food item and a lower section which applies pressure against the bottom of the rolled food item.

42. The system of claim 19, wherein said control circuit comprises a micro-controller.

43. The system of claim 19, wherein said control circuit activates said motor in response to said presence signal after a predetermined delay, said predetermined delay permitting the leading end of the supported food strip to enter said slot of said spool.

44. The system of claim 43, wherein said predetermined delay comprises 100 ms when the supported food strip is being transported at about 35 feet per minute (fpm).

45. The system of claim 19, further comprising a vacuum system, wherein said conveyor includes vacuum ports, and said supported strip of food is aligned on said conveyor with said vacuum system through said vacuum ports.

46. The system of claim 19, wherein the rolled food item comprises a dehydrated fruit product.

47. The system of claim 19, wherein the trailing end of the supported food strip is adhered to the rolled food item with a drop of an edible adhesive.

48. A system for simultaneously winding a plurality of supported strips of food into a plurality of rolled food items, each supported strip of food having a leading end and a trailing, comprising:

an extruder configured to deposit a plurality of strips of food onto a plurality of support strips;

a cutter to form a plurality of predetermined lengths of said plurality of supported food strips;

a conveyor to transport said plurality of supported food strips; and a plurality of winding units positioned at an end of said conveyor and configured to receive the leading ends of respective plurality of predetermined lengths of supported food strips, each winding unit of said plurality of winding units including:

a motor having a shaft which rotates when said motor is activated;

a spool having a slot and coupled to said shaft of said motor, wherein said slotted spool rotates when said motor is activated;

a guide positioned before said slot of said spool to direct the leading end of the supported food strip into said slot;

a sensor positioned above said guide to detect the leading end and to generate a presence signal in response thereto;

an actuator with a displaceable member;

a plate coupled to said displaceable member, said plate being positioned to permit said spool to rotate to form the rolled food item; and a control circuit associated with said motor, sensor, and actuator, said control circuit configured to activate said motor in response to said presence signal to rotate said slotted spool for a predetermined number of degrees to form the rolled food item and, after said predetermined number of degrees, activate said actuator to displace said plate and eject the rolled food item from said slotted spool.

49. The system of claim 48, wherein said conveyor is configured to transport between about 1 and about 24 supported strips of food.

50. The system of claim 48, wherein said plurality of winding units are arranged in a triangular configuration.

51. The system of claim 50, wherein said plurality of winding units are arranged in an elevated triangular configuration.

52. The system of claim 48, wherein said plurality of winding units are arranged on one side of said conveyor.

* * * * *